(12) United States Patent
Kaifu

(10) Patent No.: US 8,659,722 B2
(45) Date of Patent: Feb. 25, 2014

(54) OPTICAL DEVICE AND IMAGING DEVICE

(75) Inventor: Keita Kaifu, Tokyo (JP)

(73) Assignee: Sony Corporation, Tokyo (JP)

( * ) Notice: Subject to any disclaimer, the term of this patent is extended or adjusted under 35 U.S.C. 154(b) by 8 days.

(21) Appl. No.: 13/365,483

(22) Filed: Feb. 3, 2012

(65) Prior Publication Data

US 2012/0249895 A1 Oct. 4, 2012

(30) Foreign Application Priority Data

Mar. 31, 2011 (JP) ................................ 2011-078494

(51) Int. Cl.
*G02F 1/1333* (2006.01)
*G02F 1/1339* (2006.01)

(52) U.S. Cl.
USPC ................................ 349/89; 349/86; 349/156

(58) Field of Classification Search
USPC ...................................... 349/86, 89
See application file for complete search history.

(56) References Cited

U.S. PATENT DOCUMENTS

2009/0257016 A1* 10/2009 Ito et al. ......................... 349/153

FOREIGN PATENT DOCUMENTS

JP 2005-109630 4/2005

* cited by examiner

*Primary Examiner* — Wen-Ying P Chen
(74) *Attorney, Agent, or Firm* — Rader, Fishman & Grauer PLLC

(57) ABSTRACT

There are provided an optical device including a dimming cell capable of performing low illumination imaging without varying an optical path length, and an imaging device using the optical device. The optical device includes a cell having a containing layer between a first transparent substrate disposed on a light incident side and a second transparent substrate which is disposed on a light emitting side and faces the first transparent substrate, a variable transmittance section provided in a first region of the containing layer and allowing light transmittance to be varied within a predetermined range, and a fixed transmittance section provided in a second region different from the first region as seen from the light incident side and having a light transmittance higher than that of the variable transmittance section.

27 Claims, 16 Drawing Sheets

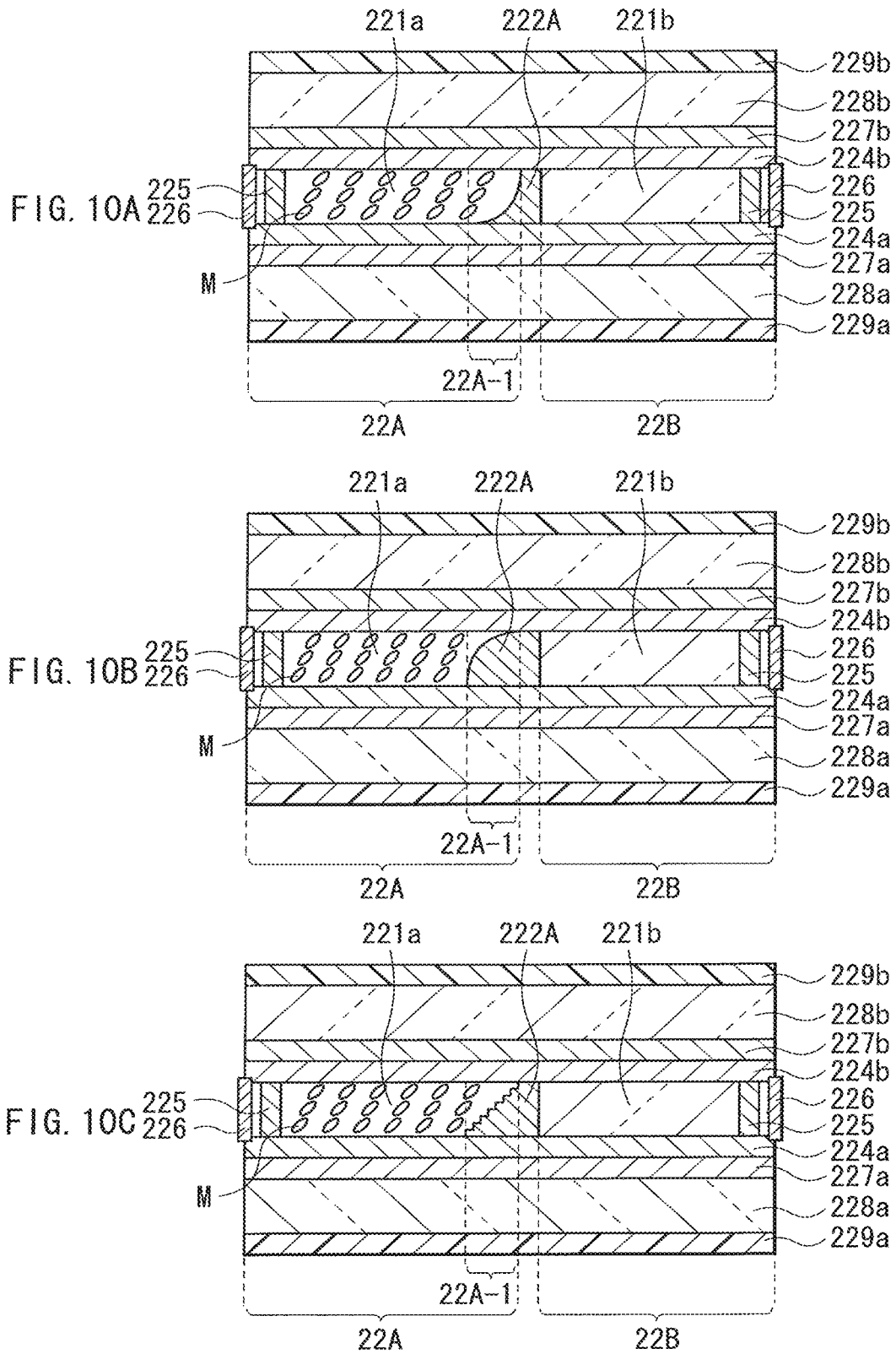

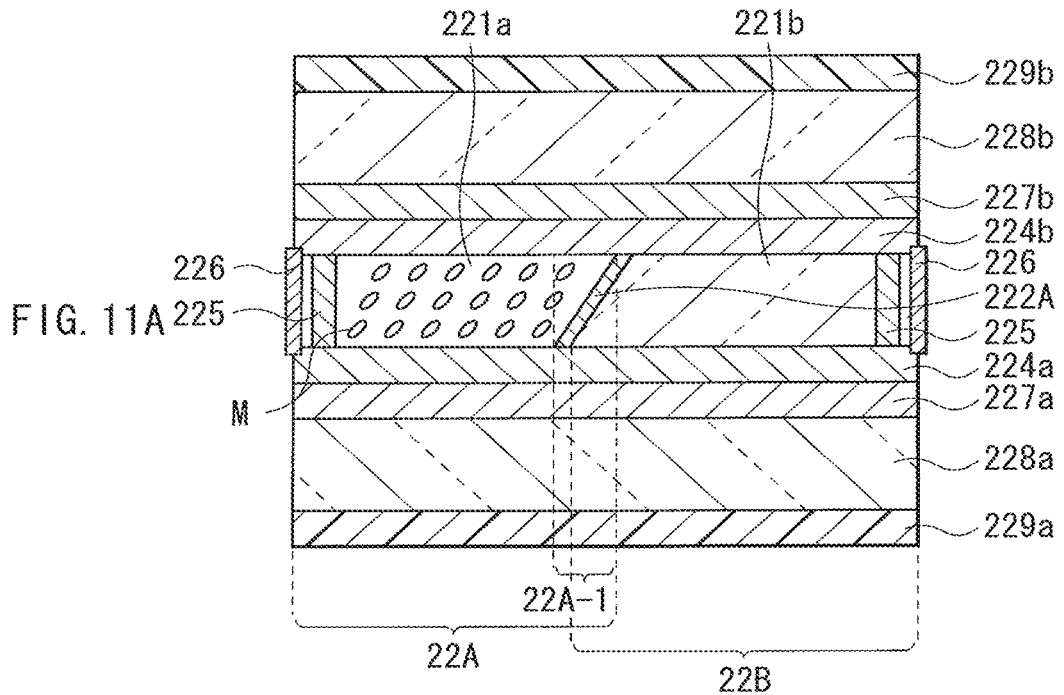
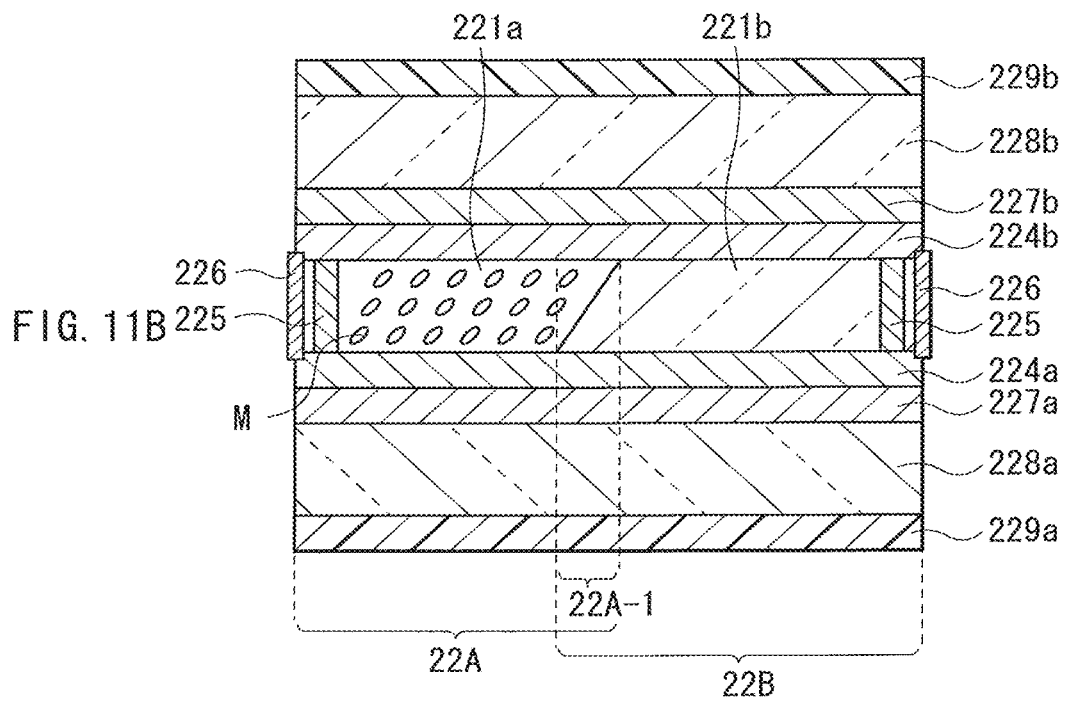

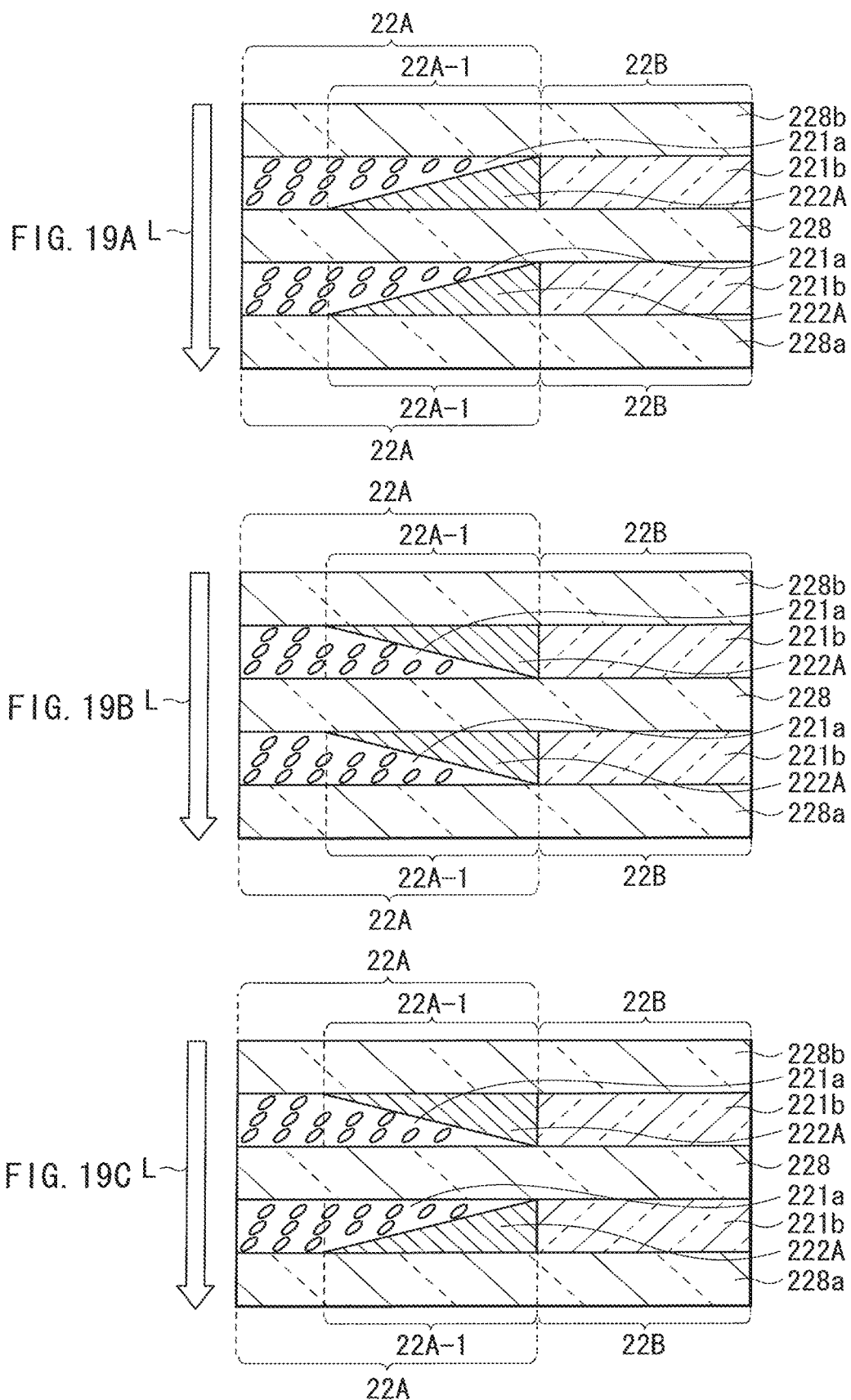

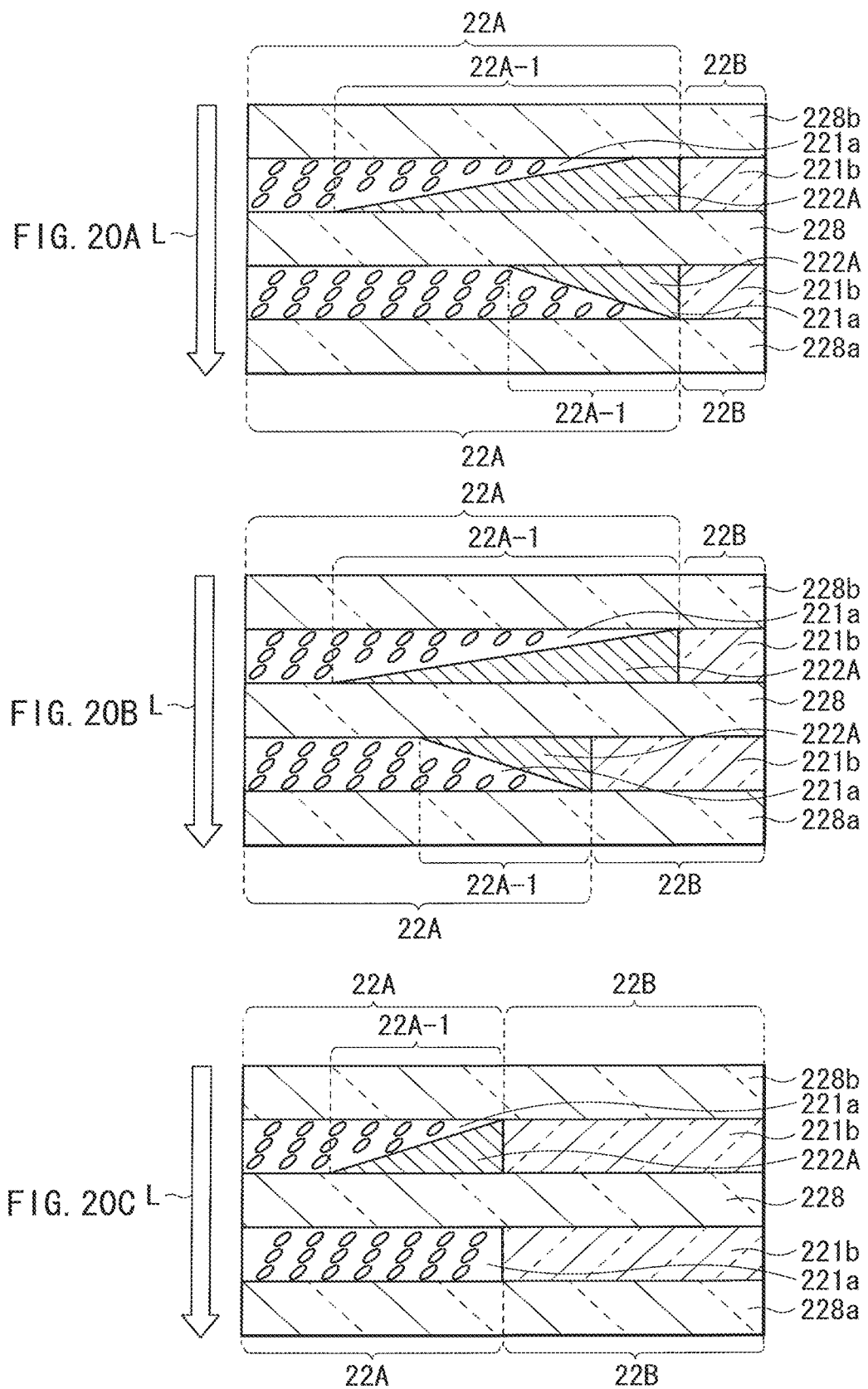

OPTICAL DEVICE AND IMAGING DEVICE

BACKGROUND

The present technology relates to an optical device for performing dimming by controlling the transmittance of light passing through a cell and an imaging device including the optical device.

For a dimming control in an imaging device, there are proposed various dimming cells capable of freely and electrically varying the transmittance of incident light. Among them, there are proposed a number of dimming cells using a liquid crystal. In such dimming cells, a guest-host (GH) type liquid crystal containing a dichroic dye is often used. The dimming cell is typically disposed at a portion where known iris diaphragms has been disposed, or a periphery portion of an imaging element.

However, when dimming is performed by disposing a dimming cell using the GH type liquid crystal on the optical path, since the GH type liquid crystal contains a dye, light is absorbed by the dye, and the maximum light transmittance of the dimming cell is decreased. This phenomenon is significant particularly when a GH type liquid crystal prepared for dark state is used, and as a result, an F number of a lens is dropped.

In order to solve such an issue, in Japanese Unexamined Patent Application Publication No. 2005-109630, a dimming control is performed such that a dimming cell containing a GH type liquid crystal is displaced from the optical axis at the time of low illumination imaging (for example, at the time of taking an image of dark scene).

SUMMARY

However, when a dimming control is performed as in Japanese Unexamined Patent Application Publication No. 2005-109630, between the case where a dimming cell is placed on the optical axis and the case where a dimming cell is displaced from the optical axis, an optical path length of the imaging device is varied due to a difference between a refractive index of a liquid crystal section and a refractive index of air. In other words, since it is necessary to reset the optical path length every time the dimming cell is shifted, disposition of a lens and exposure control become complicated.

It is desirable to provide an optical device including a dimming cell capable of performing low illumination imaging without varying an optical path length, and an imaging device using the optical device.

An optical device of an embodiment of the present technology includes a cell having a containing layer between a first transparent substrate disposed on a light incident side and a second transparent substrate which is disposed on a light emitting side and faces the first transparent substrate, a variable transmittance section provided in a first region of the containing layer and allowing light transmittance to be varied within a predetermined range, and a fixed transmittance section provided in a second region different from the first region as seen from the light incident side and having a light transmittance higher than that of the variable transmittance section.

In the optical device of the embodiment of the present technology, since the variable transmittance section and the fixed transmittance section having a light transmittance higher than that of the variable transmittance section are disposed in regions different from each other in one cell, it is possible to shift the cell according to the brightness at the time of taking an image so that the variable transmittance section, the fixed transmittance section or a region near the boundary between the variable transmittance section and the fixed transmittance section is placed on the optical axis. Further, in addition to the shifting of the cell, it is possible to place the variable transmittance section on the optical axis and vary the light transmittance of incident light by application of a voltage, for example.

An imaging device of an embodiment of the present technology includes an imaging element and an optical device. The optical device includes a cell having a containing layer between a first transparent substrate disposed on a light incident side and a second transparent substrate which is disposed on a light emitting side and faces the first transparent substrate, a variable transmittance section provided in a first region of the containing layer and allowing light transmittance to be varied within a predetermined range, and a fixed transmittance section provided in a second region different from the first region as seen from the light incident side and having a light transmittance higher than that of the variable transmittance section. The optical device performs dimming to perform imaging.

With the optical device and the imaging device of the embodiments of the present technology, since the variable transmittance section and the fixed transmittance section having a light transmittance higher than that of the variable transmittance section are provided in one cell, it is possible to shift the cell to place the fixed transmittance section having higher light transmittance on the optical axis at the time of the low illumination imaging. Therefore, the low illumination imaging may be performed without varying the optical path length.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

FIGS. 10A to 10C are cross-sectional views illustrating a modification of the partition section shown in FIG. 9.

FIGS. 11A and 11B are cross-sectional views illustrating a modification of a layer thickness changing region shown in FIG. 9.

FIGS. 19A to 19C are cross-sectional views according to a modification of the dimming cell shown in FIG. 18.

FIGS. 20A to 20C are cross-sectional views according to another modification of the dimming cell shown in FIG. 18.

DETAILED DESCRIPTION

Embodiments of the present technology will be specifically described below with reference to the drawings. The description will be made in the following order.

1. First Embodiment (an example of an optical device in which a face, close to a fixed transmittance section, of a variable transmittance section is parallel to an optical axis)
2. Second Embodiment (an example of an optical device in which a face, close to a fixed transmittance section, of a variable transmittance section is inclined relative to an optical axis)
3. Modification (an example of an optical device in which a plurality of variable transmittance sections and fixed transmittance sections are disposed in an optical path direction)

[First Embodiment]
[General Configuration of Imaging Device 1]

Figure 1:
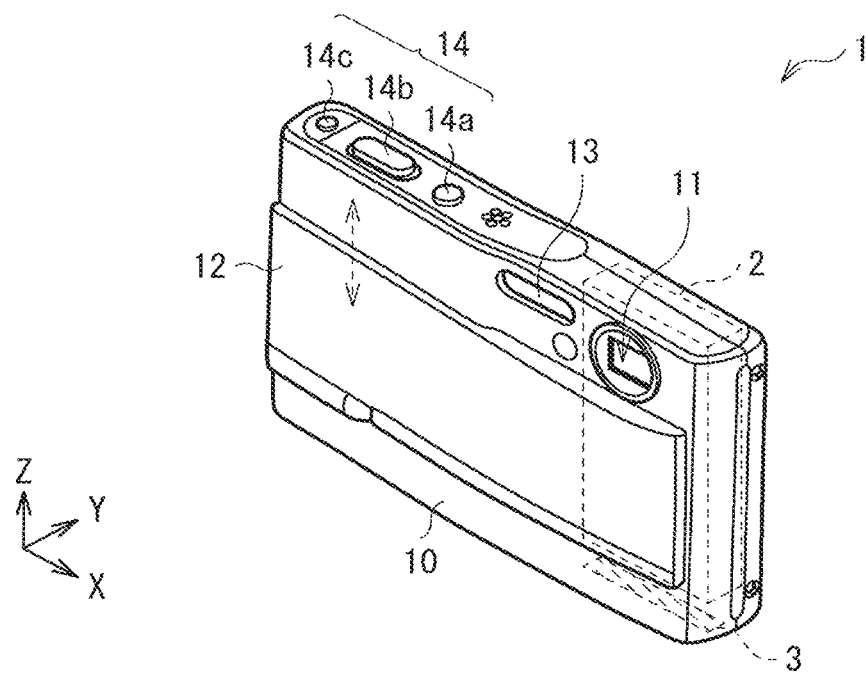
FIG. 1 is a perspective view illustrating an exemplary external configuration of an imaging device according to an application example of the present disclosure.

FIG. 1 is a perspective view illustrating a general configuration (external configuration) of an imaging device (imaging device 1) to which an optical device (optical device 5 described later) according to a first embodiment of the present disclosure is applied. The imaging device 1 is a digital camera (digital still camera) for converting an optical image of an object to an electric signal with use of an imaging element (an imaging element 3 described later). The image signal (digital signal) obtained as described above may be recorded in a semiconductor recording medium (not shown), and displayed on a display device such as a liquid crystal display (not shown).

In the imaging device 1, a lens section 11, a lens cover 12, a flash 13, and an operation button 14 are provided on a main body section 10 (housing). Specifically, the lens section 11, the lens cover 12, and the flash 13 are disposed on a front face (Z-X plane) of the main body section 10, and the operation button 14 is disposed on an upper face (X-Y plane) of the main body section 10. The imaging device 1 also includes, in the main body section 10, a lens barrel device 2 (lens tube device) having the above-mentioned lens section 11, an imaging element 3, and a control processing section (a control processing section 4 described later). In addition to these components, a battery, a microphone, a speaker or the like (which are not shown), are provided in the main body section 10.

Figure 2:
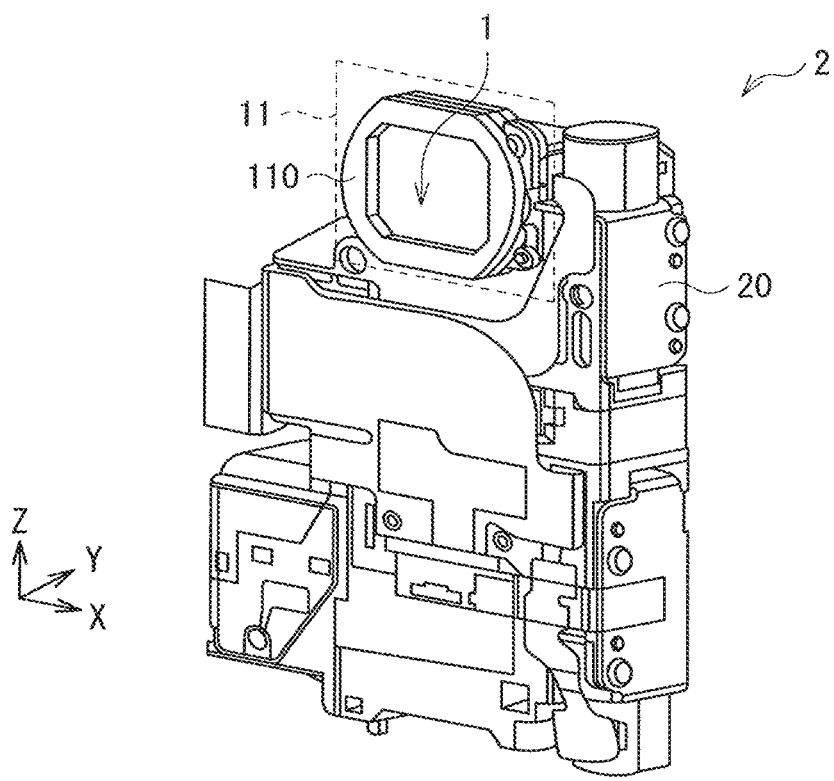
FIG. 2 is a perspective view illustrating an exemplary external configuration of a lens barrel device shown in FIG. 1.

The lens barrel device 2 may be of a flexion type (bending type) which refracts the optical path of inputted image light to emit the light, or of a collapsible type in which the optical path is a straight line. In the case of the refraction type, the thickness of the lens barrel device 2 may be reduced (the thickness in Y axis direction may be reduced). The lens barrel device 2 has an external configuration as shown in FIG. 2 for example. Specifically, in the lens barrel device 2, the above-mentioned lens section 11 is disposed at the upper portion of the tubular member 20 (at an edge portion in a positive direction of Z axis). The lens section 11 is made up of an objective lens (part of a lens group 21 described later), and a front frame 110 configuring a part of the main body section 10.

The imaging element 3 is an element which detects image light emitted from the lens barrel device 2 to acquire an image signal. The imaging element 3 is configured of an imaging sensor such as CCD (Charge-Coupled Devices) and CMOS (Complementary Metal-Oxide Semiconductor).

The lens cover 12 is a member for protecting the lens section 11 from outside, and may be shifted along the Z axis direction as shown by an arrow of a broken line in the figure. Specifically, when taking an image of an object, the lens cover 12 is placed at a lower side of the lens section 11 to expose the lens section 11 to outside. On the other hand, at other times than when taking an image, the lens cover 12 is placed above the lens section 11 to prevent the lens section 11 from being exposed to outside.

Here, the operation button 14 is made up of a power button 14a for turning on or off the power of the imaging device 1, a record button 14b (shutter button) for imaging an object, and a hands movement correction button 14c for performing a predetermined image blurring correction on an image signal. It is to be noted that, in addition to (or in place of) these components, a button for performing other operations may be provided on the main body section 10.

[Specific Configuration of Dimming Cell 22]

Figure 3:
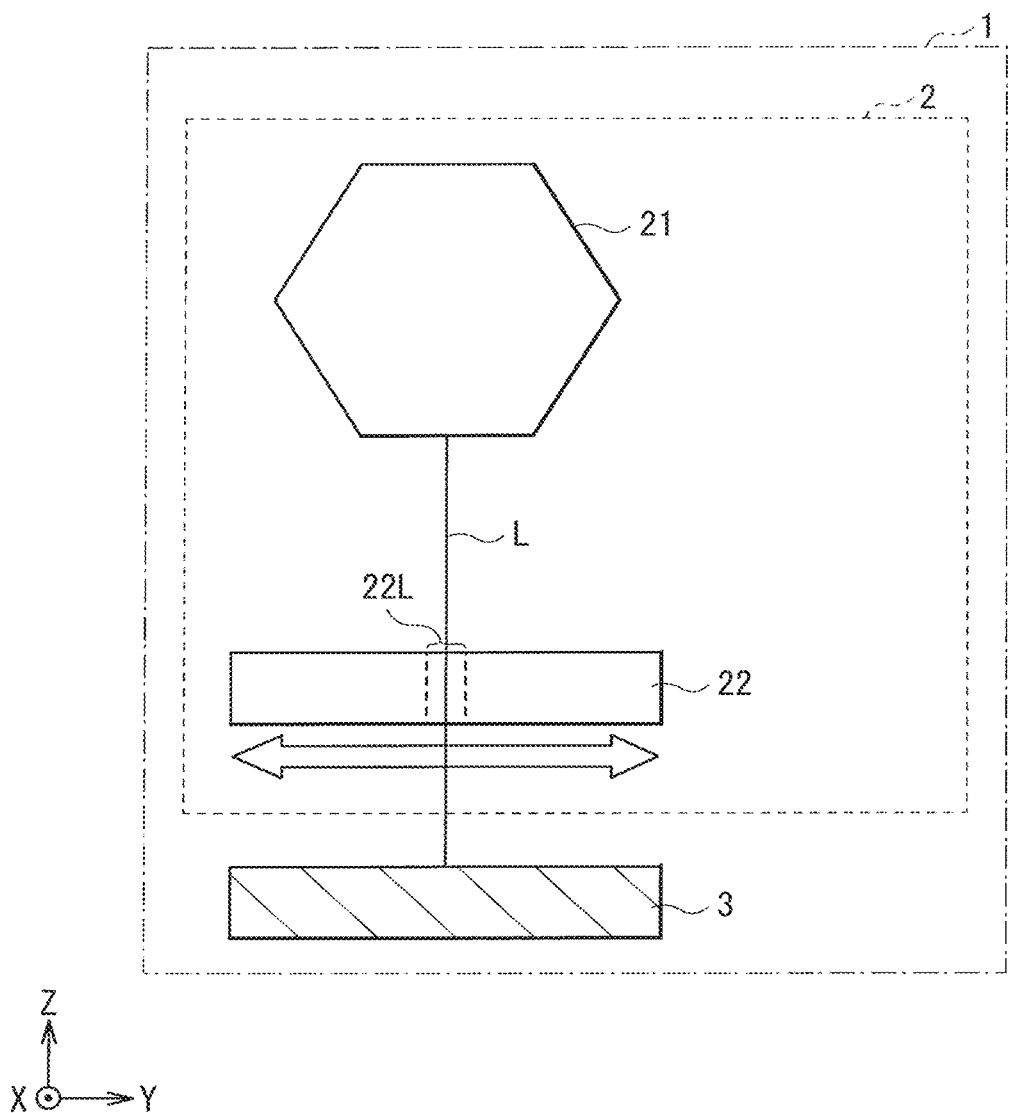
FIG. 3 is a schematic view illustrating an exemplary configuration of an optical system in the lens barrel device or the like shown in FIG. 1.
Figure 4:
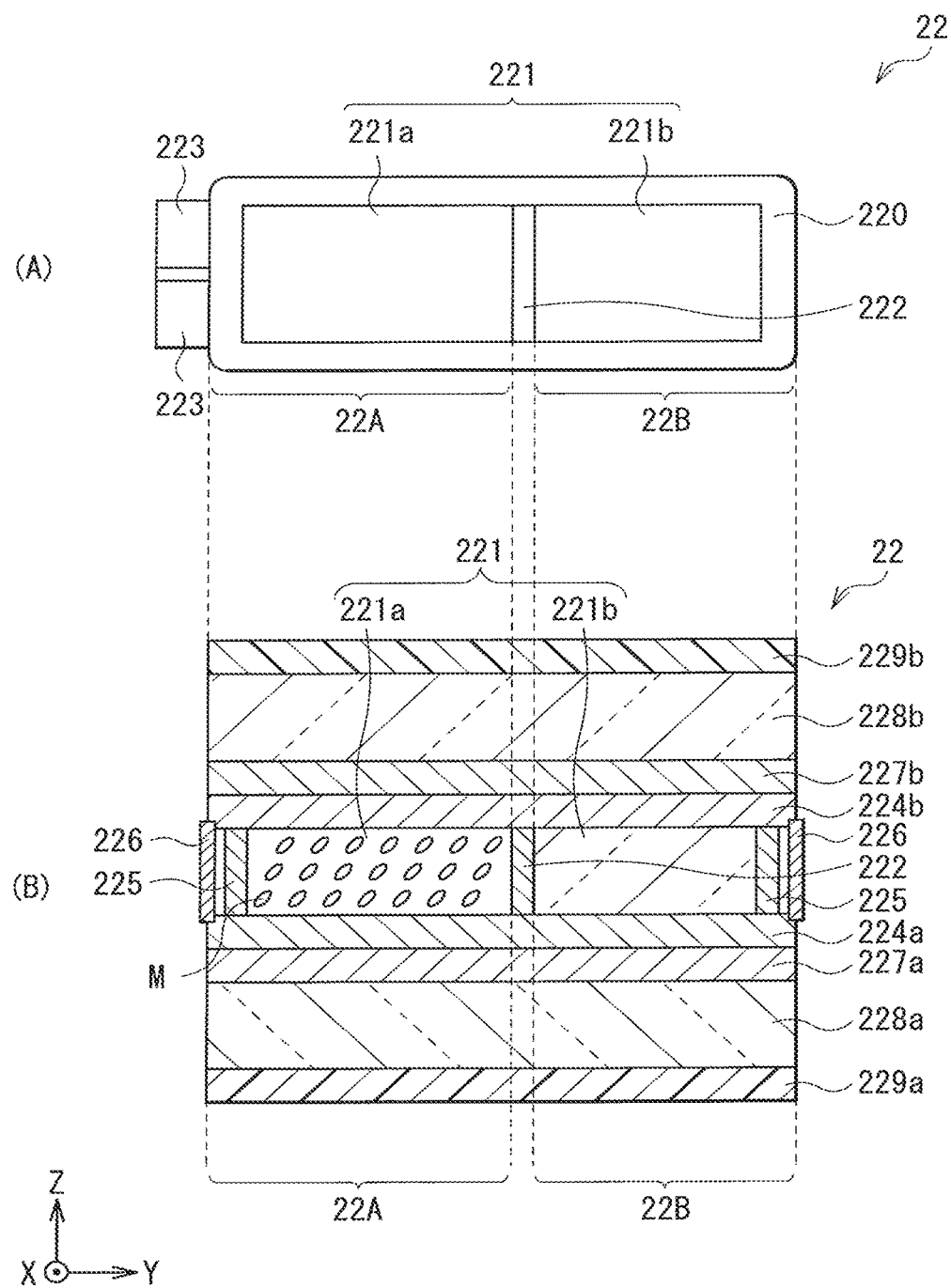
FIG. 4 is a view illustrating a dimming cell (optical device) according to a first embodiment of the present disclosure.

As shown in FIG. 3, the lens barrel device 2 includes a lens group 21 and a dimming cell 22, and the dimming cell 22 is disposed between the lens group 21 and the imaging element 3. An optical device 5 of the present embodiment is made up of the dimming cell 22 and a part of a control processing section 4 described later, and configured to perform a sequence of dimming operation. Referring to FIG. 4, the dimming cell 22 is described below. It is to be noted that, FIG. 4 schematically illustrates a configuration of the dimming cell 22, and differ from the actual size and shape.

(A) of FIG. 4 illustrates a plan configuration of the dimming cell 22, and (B) of FIG. 4 illustrates an exemplary sectional configuration (an exemplary Y-Z sectional configuration) of the dimming cell 22. The dimming cell 22 is an element for adjusting the amount of image light, and performs an adjustment (dimming) of a light amount electrically. Of the dimming cell 22, a part which is placed on an optical axis L connecting the lens group 21 and the imaging element 3 is a dimming section 22L (FIG. 3). The dimming cell 22 has a containing layer 221 in a cell shell 220, and the containing layer 221 is provided with a first region 22A and a second region 22B which are different from each other in light transmittance. The first region 22A and the second region 22B are disposed at adjacent positions in a direction intersecting with the optical axis L (for example, in perpendicular direction) in the dimming cell 22. The first region 22A is provided with a variable transmittance section, or a liquid crystal section 221a, capable of varying a light transmittance according to a voltage, and the second region 22B is provided with a fixed transmittance section, or a transparent section 221b, having a fixed light transmittance. A partition section 222 is provided between the liquid crystal section 221a and the transparent section 221b. The ratio between the width of the first region 22A (distance in Y direction) and the width of the second region 22B is not specifically limited, and in this dimming cell 22, for example, the first region 22A and the second region 22B have the same width. An electrode 223 attached on the outer side of the cell shell 220 is connected to the control processing section 4 (a liquid crystal driving section 47 described later).

As shown in (B) of FIG. 4, the dimming cell 22 has a laminate structure in which a transparent substrate 228a (second transparent substrate), a transparent electrode 227a, an orientation film 224a, a containing layer 221 including the liquid crystal section 221a and the transparent section 221b, an orientation film 224b, a transparent electrode 227b, and a transparent substrate 228b (first transparent substrate) are disposed in this order. In other words, the containing layer 221 is disposed between the transparent substrate 228a and the transparent substrate 228b. On the outer sides of transparent substrate 228a and 228b (on the side opposite to the transparent electrode 227a and on the side opposite to the transparent electrode 227b), antireflection films 229a and 229b are provided, respectively. Spacers 225 are provided between the orientation film 224a and the orientation film 224b, and thus the liquid crystal section 221a and the transparent section 221b are substantially equal to each other in thickness (thickness in the laminated direction). Sealing agents 226 are configured to enclose the liquid crystal section 221a and the transparent section 221b in the dimming cell 22, and provided in such a manner as to cover the side faces of the liquid crystal section 221a and the transparent section 221b. Light coming from the lens group 21 perpendicularly enters the dimming cell 22 from the face on the transparent substrate 228b side (light incident face), and passes through the liquid crystal section 221a or the transparent section 221b. Then, the light is emitted to the imaging element 3 from the face on the transparent substrate 228a side (light emission face) opposite to the transparent substrate 228b. Specifically, the liquid crystal section 221a and the transparent section 221b are disposed in different regions as seen in the light incident direction; more specifically, they are disposed in regions adjacent to each other with the partition section 222 therebetween.

The liquid crystal section 221a is a layer containing liquid crystal molecules, and in this configuration, the liquid crystal section 221a contains predetermined dichroic dye molecules in addition to the liquid crystal molecules (for the sake of brevity, in (B) of FIG. 4, the liquid crystal molecules and the dichroic dye molecules are collectively shown as "molecule M"). In other words, the liquid crystal section 221a is configured of a GH type liquid crystal containing a dichroic dye.

The GH type liquid crystal is roughly divided into a negative type and a positive type according to a difference in the longitudinal direction of the liquid crystal molecules upon application of a voltage. In the GH type liquid crystal of the positive type, when no voltage is applied thereto, the longitudinal direction of the liquid crystal molecules is perpendicular to the optical axis, and when a voltage is applied thereto, the longitudinal direction of the liquid crystal molecules is parallel to the optical axis. On the other hand, in the GH type liquid crystal of the negative type, conversely, when no voltage is applied thereto, the longitudinal direction of the liquid crystal molecules is parallel to the optical axis, and when a voltage is applied thereto, the longitudinal direction of the liquid crystal molecules is perpendicular to the optical axis. Here, the dye molecules are oriented in the same direction (orientation) as the liquid crystal molecules, and therefore, in the case where a liquid crystal of the positive type is used as a host, when no voltage is applied thereto, light transmittance is relatively low (the light emission side is relatively dark), and when a voltage is applied thereto, light transmittance is relatively high (the light emission side is relatively bright). On the other hand, in the case where a liquid crystal of the negative type is used as a host, conversely, when no voltage is applied thereto, light transmittance is relatively high (the light emission side is relatively bright), and when a voltage is applied thereto, light transmittance is relatively low (the light emission side is relatively dark). In either case where the liquid crystal section 221a is configured of the above-mentioned liquid crystal of the positive type or the negative type, the liquid crystal section 221a may vary the light transmittance within a predetermined range by the voltage value applied thereto.

Figure 5:
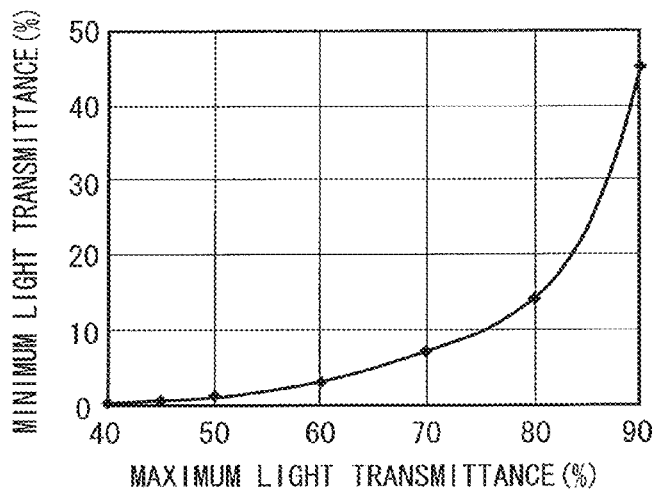
FIG. 5 is a view illustrating an exemplary relationship between a maximum light transmittance and a minimum light transmittance of a GH type liquid crystal.

FIG. 5 shows an exemplary dimming range of the GH type liquid crystal, and the horizontal axis represents the maximum light transmittance (%) and the vertical axis represents the minimum light transmittance (%). Numeric values representing the dimming range vary depending on the configuration of a cell, the host liquid crystal, the dye performance, or the like; however, the tendency of the curve shown in FIG. 5 applies to all cases. In the case where the GH type liquid crystal is prepared such that the minimum light transmittance is 0.5% or lower, the maximum light transmittance is approximately 50%. When the GH type liquid crystal having such a wide dimming range is employed in the imaging device 1, it is possible to increase stops seven or more. For example, even in the case of a bright lens having a brightness value corresponding to F-number of 1.8, the F-number may be increased to a brightness value corresponding to F-number of 22, so that no matter how bright the scene is, it is possible to take an image with high resolution, without changing exposure time. Naturally, depending on the preparation of the GH type liquid crystal, it is possible to take an image of significantly bright scene of F-number of 30 or more. However, when such a GH type liquid crystal having relatively low maximum light transmittance is used in the imaging device 1, since a use of a GH type liquid crystal having a maximum light transmittance of 50% is equal to the case where a filter decreasing light by 50% is preliminarily provided, the brightness of the lens is decreased. Although details thereof are described later, since the dimming cell 22 is provided with the transparent section 221b in the present embodiment, even in a lens (or bright lens) having an F-number of 1.8 to 2.6 or so, for example, it is possible to use a GH type liquid crystal having a low maximum light transmittance while maintaining the brightness.

The transparent section 221b has a light transmittance higher than the light transmittance of the liquid crystal section 221a even when the light transmittance of the liquid crystal section 221a is relatively high (in the case of the positive type, when a voltage is applied thereto; in the case of the negative type, when no voltage is applied thereto), and preferably the light transmittance is close to 100%. In order that the optical path lengths of the liquid crystal section 221a and the transparent section 221b are substantially identical to each other, the refractive index (Nc) of the transparent section 221b is substantially identical to the refractive index of the liquid crystal section 221. Specifically, it is preferable that the refractive index Nc of the transparent section 221b vary according to the variation of the light transmittance of the liquid crystal section 221a, and that the refractive index Nc of the transparent section 221b be a value between the maximum value Ne and the minimum value No of the refractive index of the liquid crystal section 221a (No≤Nc≤Ne). For example, the maximum value Ne of the refractive index of the liquid crystal section 221a is a refractive index derived from a molecular polarizability of molecules M in a longitudinal direction, and the minimum value No is a refractive index derived from a molecular polarizability of a molecules M in a short axis direction. The transparent section 221b is made from, for example, a resin material to which an additive is added for adjusting the refractive index. As the resin material, an adhesive material used for bonding a lens such as an epoxy resin, an acrylic resin, polyurethane, or the like may be used.

The partition section 222 is configured to prevent the liquid crystal section 221a and the transparent section 221b from being mixed with each other, and is provided between the liquid crystal section 221a and the transparent section 221b in such a manner as to extend from the orientation film 224a to the orientation film 224b. In the present embodiment, the partition section 222 has a rectangular shape in cross-section (vertical cross-section), and the direction thereof is parallel to the optical axis L. In other words, a face (opposing face), close to the transparent section 221b, of the liquid crystal section 221a is parallel to the optical axis L. The partition section 222 is made from a material similar to that of orientation films 224a and 224b described below, the sealing agents 226, or the like, for example. The width of the partition section 222 (the distance in Y axis direction) is smaller than that of the dimming section 22L, and is 50 µm, for example.

Each of the transparent electrodes 227a and 227b is an electrode for applying a voltage (driving voltage) to the liquid crystal section 221a, and made of indium tin oxide (ITO), for example. The transparent electrodes 227a and 227b are connected to the electrode 223. It is to be noted that, the position of the electrode 223 is not limited to the place where the electrode 223 is disposed in FIG. 4A.

The transparent substrate 228a is a substrate for supporting the transparent electrode 227a and the orientation film 224a, and enclosing, with the transparent substrate 228b, the liquid crystal section 221a and the transparent section 221b. The transparent electrode 227b and the orientation film 224b are supported by the transparent substrate 228b. The transparent substrates 228a and 228b is made of an alkali-free glass, for example.

The sealing agents 226 are members for enclosing the liquid crystal section 221a and the transparent section 221b from the lateral sides, and made of an adhesive material such as an epoxy adhesive material and an acrylic adhesive material. The spacers 225 are members for maintaining the cell gap (thickness) of the liquid crystal section 221a and the transparent section 221b constant, and made of a predetermined resin material or a glass, for example. The thickness of the liquid crystal section 221a and the transparent section 221b is approximately 3 nm to 10 µm, for example.

[Block Configuration of Control Processing Section 4]

Figure 6:
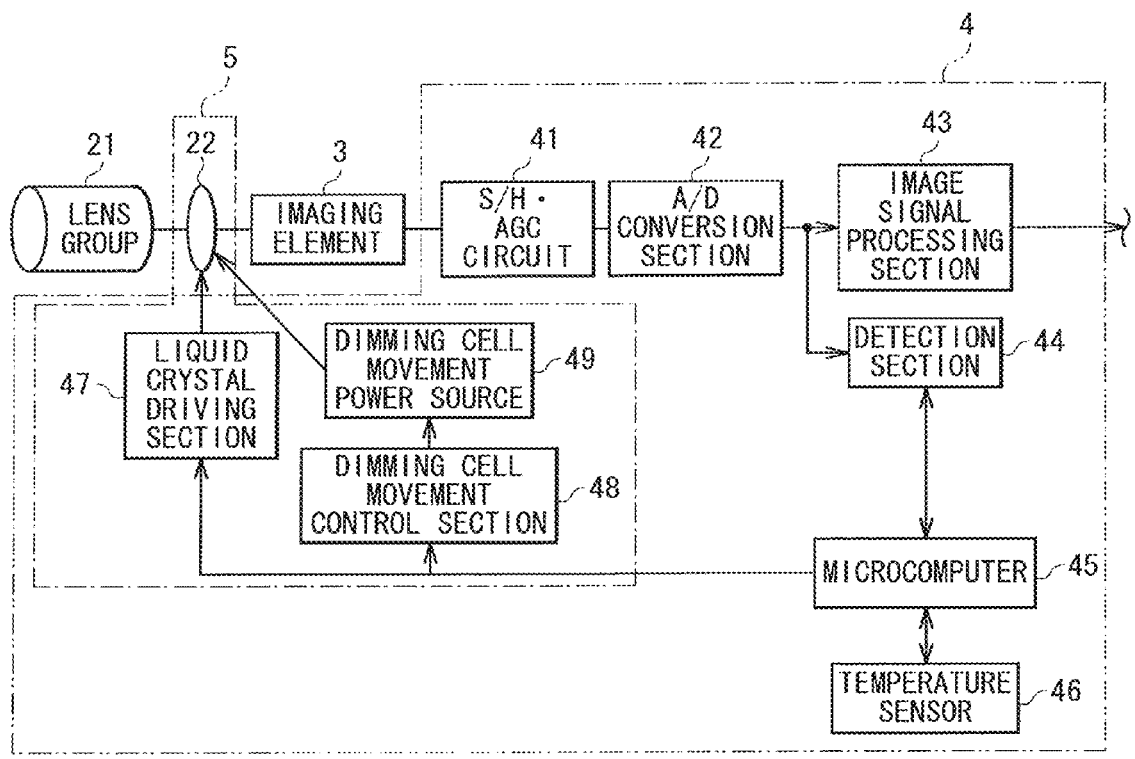
FIG. 6 is a block diagram illustrating an exemplary configuration of a control processing section or the like in the imaging device shown in FIG. 1.

Next, a configuration of the above-mentioned control processing section 4 is described. FIG. 6 illustrates a block configuration of the control processing section 4, together with the dimming cell 22 and the imaging element 3.

As described below, the control processing section 4 performs predetermined processing on an image signal obtained in the imaging element 3, and performs a predetermined feedback control of the dimming cell 22 in the lens barrel device 2. The control processing section 4 has, an S/H·AGC circuit 41, an A/D conversion section 42, an image signal processing section 43, a detection section 44, a microcomputer 45, a temperature sensor 46, a liquid crystal driving section 47, a dimming cell movement control section 48, and a dimming cell movement power source 49.

The S/H·AGC circuit 41 is a circuit for performing S/H (sample and hold) processing on an image signal outputted by the imaging element 3 and predetermined signal amplification processing using an AGC (Automatic Gain Control) function.

The A/D conversion section 42 performs A/D conversion (analog/digital conversion) processing on an image signal outputted by the S/H·AGC circuit 41 to generate an image signal as a digital signal.

The image signal processing section 43 performs predetermined signal processing (e.g. image quality improving processing) on an image signal (digital signal) outputted by the A/D conversion section 42. The image signal subjected to the above signal processing is outputted to the outside of the control processing section 4 (such as a semiconductor recording medium not shown).

The detection section 44 performs a predetermined AE detection on an image signal (digital signal) outputted by the A/D conversion section 42, and outputs the resulting detection value.

The temperature sensor 46 is a sensor for detecting the temperature of the dimming cell 22, and disposed in the proximity (in a peripheral region) of the dimming cell 22. It is to be noted that, the detected temperature information of the dimming cell 22 is outputted to the microcomputer 45.

The microcomputer 45 supplies the liquid crystal driving section 47 with a control signal regarding a voltage value to be applied to the liquid crystal section 221a, and supplies the dimming cell movement control section 48 with a control signal regarding a movement direction and a movement amount of the dimming cell 22. Specifically, the liquid crystal driving section 47 and the dimming cell movement control section 48 set up a dimming operation for the dimming cell 22 based on the detection value supplied from the detection section 44. In addition, the microcomputer 45 has a function of performing a predetermined temperature correction (a temperature correction of the voltage value to be applied) utilizing the temperature information of the dimming cell 22 outputted from the temperature sensor 46, with use of data showing "correspondence relationship between temperature and transmission light amount" preliminarily held in a storage section (memory) not shown.

The liquid crystal driving section 47 performs a driving operation of the liquid crystal section 221a based on a control signal supplied from the microcomputer 45 and regarding a voltage value to be applied. Specifically, the liquid crystal driving section 47 applies, through the electrode 223, a set voltage between the transparent electrodes 227a and 227b provided in the dimming cell 22. The dimming cell movement control section 48 supplies, based on a signal from the microcomputer 45, the dimming cell movement power source 49 with a control signal regarding a movement direction and a movement amount of the dimming cell 22 so that one of the liquid crystal section 221a, the transparent section 221b, and a region near the boundary between the liquid crystal section 221a and the transparent section 221b is placed at the dimming section 22L, and then the dimming cell movement power source 49 appropriately shifts the dimming cell 22 to the most appropriate position. The optical device 5 of the present embodiment is made up of the dimming cell 22, and the liquid crystal driving section 47, the dimming cell movement control section 48, and the dimming cell movement power source 49 of the control processing section 4.

[Function and Effect of Imaging Device 1]

(1. Image Taking Operation)

In the imaging device 1, when the operation button 14 shown in FIG. 1 is operated by a user, an operation for taking an image of an object is performed to obtain an image (image data). Specifically, as shown in FIG. 1 to FIG. 3, first, image light enters the lens barrel device 2 through the lens section 11, and then passes through the lens group 21 and the dimming cell 22 along an optical axis L. Thereafter, the image light is emitted to the imaging element 3 so as to be detected. The control processing section 4 performs predetermined signal processing on the image signal thus obtained in the imaging element 3. In addition, based on the obtained image signal, the control processing section 4 performs the above-mentioned predetermined feedback control on the dimming cell 22 provided in the lens barrel device 2.

Figure 7A:
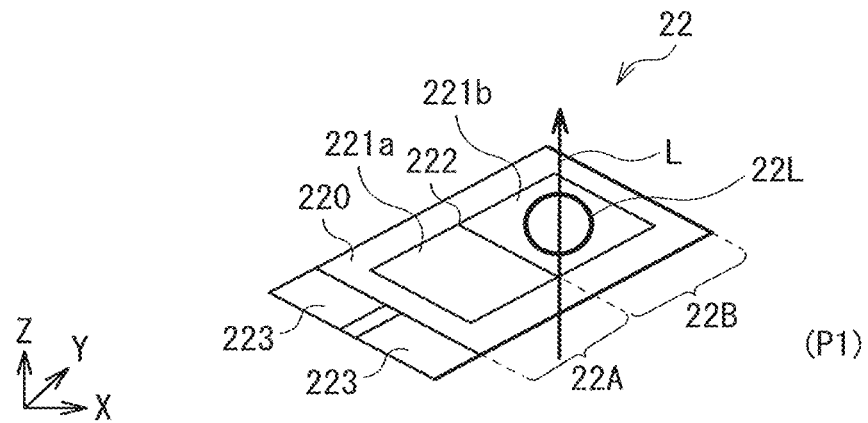
FIGS. 7A to 7C are perspective views for describing an operation of the dimming cell shown in FIG. 4.
Figure 7B:
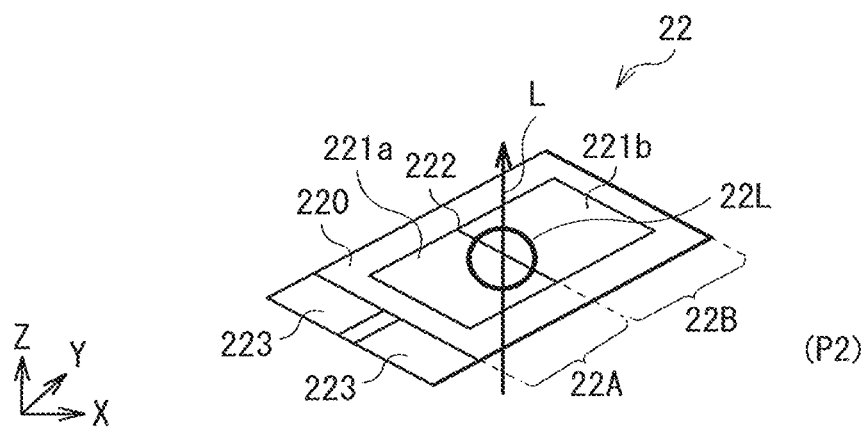
Figure 7C:
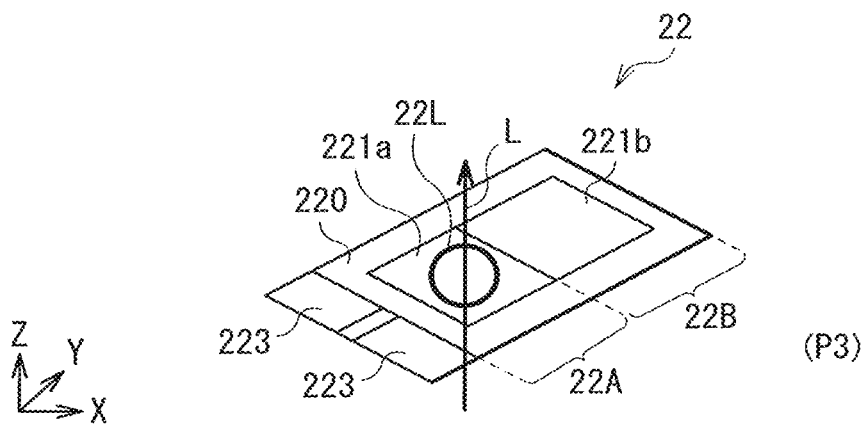

At this time, the dimming cell 22 is shifted in the direction in which the liquid crystal section 221a and the transparent section 221b are laid out (Y axis direction), and, according to the brightness of a scene to be imaged, as shown in FIGS. 7A to 7C, one of the transparent section 221b (FIG. 7A), the region near the boundary between the liquid crystal section 221a and the transparent section 221b (FIG. 7B), and the liquid crystal section 221a (FIG. 7C) is placed at the dimming section 22L. In the following description, a state where the transparent section 221b is placed at the dimming section 22L is represented by P1, a state where the region near the boundary between the liquid crystal section 221a and the transparent section 221b is placed at the dimming section 22L is represented by P2, and a state where the liquid crystal section 221a is placed at the dimming section 22L is represented by P3. After the dimming cell 22 is put into one of the states P1, P2, and P3, image light inputted from the antireflection film 229 side passes through the liquid crystal section 221a and the transparent section 221b, and thereafter, the image light is emitted from the antireflection film 229a side. In addition, in the state P2 or P3, when a predetermined voltage (driving voltage) is applied to the liquid crystal section 221a, the orientation direction (longitudinal direction) of molecules M (liquid crystal molecules and dye molecules) is varied, and according to this, the amount of the image light passing through the liquid crystal section 221a is also varied. In other words, by adjusting the place and the driving voltage of the dimming cell 22, it is possible to adjust the amount of image light passing through the entirety of the dimming cell 22. Thus, adjustment (dimming) of the amount of image light is performed in the lens barrel device 2.

(2. Function of Dimming Cell 22)

A function of a characteristic part of the dimming cell 22 is specifically described with use of a comparative example.

Figure 8A:
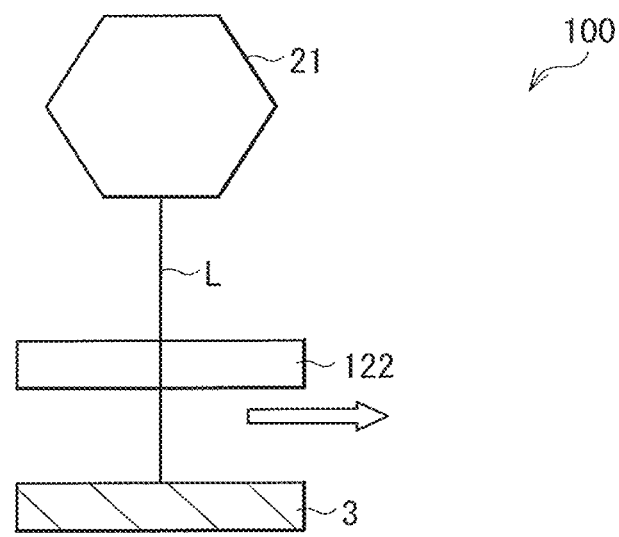
FIGS. 8A and 8B are views for describing an operation of a dimming cell according to a comparative example.
Figure 8B:
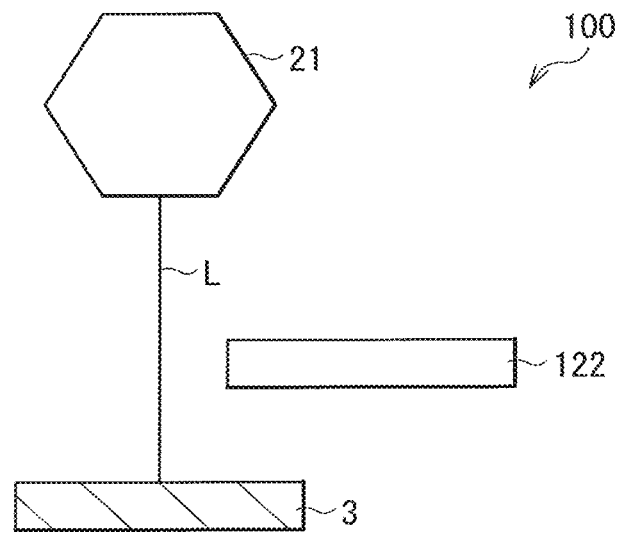

FIGS. 8A and 8B illustrate a configuration of an imaging device 100 according to the comparative example, and the imaging device 100 includes a dimming cell 122 configured only of a GH type liquid crystal section. In the imaging device 100, in the case of a bright scene or the like which necessitates dimming, the dimming cell 122 is placed on the optical axis L as shown in FIG. 8A, and in the case where an image is taken in a dark scene or the like which does not necessitate dimming (at the time of low illumination imaging), the dimming cell 122 is completely displaced from the optical axis L as shown in FIG. 8B. By shifting the dimming cell 122 in this way, it is possible to prevent the brightness of a lens from dropping due to a GH type liquid crystal having a low maximum light transmittance. However, due to the difference in refractive index between the liquid crystal section of the dimming cell 122 and air, in the imaging device 100, the optical path length of the case shown in FIG. 8A and the optical path length of the case shown in FIG. 8B are different from each other. For this reason, it is necessary to reset the optical path length every time the dimming cell 122 is shifted, and consequently, the placement of a lens and the exposure control become complicated. In addition, at the moment when the dimming cell 122 displaced from the optical axis L (FIG. 8B) is placed on the optical axis L (FIG. 8A), a diffraction of light is caused, and therefore the resolution is deteriorated. Such a diffraction caused by an edge portion may be reduced by raising the speed of the movement operation; however, the size of an actuator is increased in that case.

In order to perform dimming without varying the optical path length, it is conceivable to interpose a dummy glass separately from the dimming cell 122 in the case of FIG. 8B. However, since in this configuration, two parts, the dimming cell 122 and the dummy glass, are used to perform an operation, the control becomes more complicated, which is also disadvantageous in terms of cost. In addition, a space for installing a driving actuator may be increased.

Meanwhile, in the optical device 5 of the present embodiment, each dimming cell 22 is provided with the liquid crystal section 221a and the transparent section 221b having a light transmittance higher than that of the liquid crystal section 221a. The liquid crystal section 221a and the transparent section 221b have substantially the same optical path length (thickness and refractive index). Consequently, without varying the optical path length, dimming may be broadly performed according to the brightness of a scene to be imaged.

As shown in FIGS. 7A to 7C, in the dimming cell 22, based on the control signal from the dimming cell movement control section 48, in the case of low illumination imaging which does not necessitate dimming, the dimming cell movement power source 49 places the transparent section 221b at the dimming section 22L as shown by P1 (FIG. 7A) so that image light passes through the transparent section 221b. In the case where dimming is necessary, the dimming cell movement power source 49 places the dimming cell 22 at the dimming section 22L as shown by P2 (FIG. 7B) or P3 (FIG. 7C) so that image light passes through the liquid crystal section 221a. Since, in one dimming cell 22, the liquid crystal section 221a and the transparent section 221b have substantially the same thickness and refractive index, the optical path length is not varied in any of the states P1 to P3. In addition, since the liquid crystal section 221a and the transparent section 221b are provided in one dimming cell 22, there is no risk that the resolution is deteriorated due to the diffraction at an edge portion of the cell, and a large actuator for increasing the shifting speed is not necessary. Further, since it is only necessary to control one part (dimming cell 22), the mechanism and the control system may be easily designed, and the cost and the installation space for the actuator may be decreased.

As described above, in the imaging device 1 of the present embodiment, the liquid crystal section 221a and the transparent section 221b (second region 22B) are provided adjacent to each other in the dimming cell 22, so that, at the time of low illumination imaging, the transparent section 221b which has a light transmittance of approximately 100% may be placed at the dimming section 22L by shifting the dimming cell 22. Therefore, even when the liquid crystal section 221a is configured of a GH type liquid crystal having a low maximum light transmittance, the brightness of the lens may be maintained, and low illumination imaging may be performed without varying the optical path length.

Below, another embodiment and modifications are described, and it is to be noted that the same reference numerals are given to the same components as those of the first embodiment, and description thereof is appropriately omitted.

[Second Embodiment]

Figure 9:
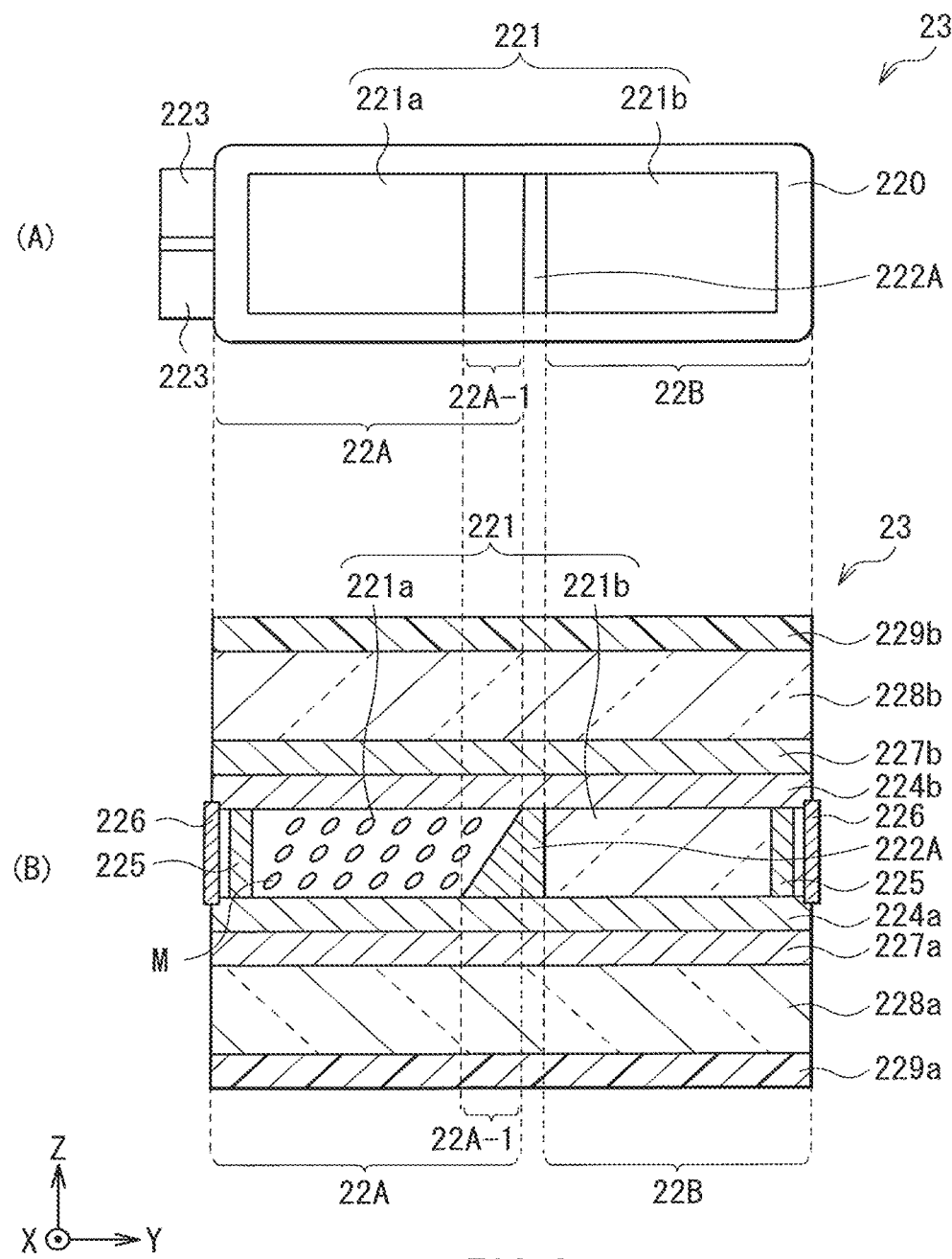
FIG. 9 is a view illustrating a dimming cell (optical device) according to a second embodiment of the present disclosure.

(A) and (B) of FIG. 9 schematically illustrate an exemplary plan configuration and an exemplary sectional configuration (an exemplary Y-Z sectional configuration) of a dimming cell (dimming cell 23) configuring an optical device (optical device 5) according to a second embodiment, respectively. The dimming cell 23 is different from the above-mentioned first embodiment in that a face, close to a transparent section 221b, of a liquid crystal section 221a is inclined relative to an optical axis L.

In the dimming cell 23, the liquid crystal section 221a has a layer thickness changing region 22A-1 on a side close to a second region 22b. The thickness of the liquid crystal section 221a outside the layer thickness changing region 22A-1 is uniform, whereas, in the layer thickness changing region 22A-1, the thickness of the liquid crystal section 221a decreases toward the transparent section 221b. According to the difference in thickness of the liquid crystal section 221a, a face, close to the transparent section 221b, of the liquid crystal section 221a is inclined relative to the optical axis L. Although the width (distance in Y axis direction) and the inclination angle of the layer thickness changing region 22A-1 may be arbitrarily designed, if the width of the layer thickness changing region 22A-1 is extremely small (for example, tens of microns), an effect of the layer thickness changing region 22A-1 described below may not be sufficiently obtained, and therefore the width of the layer thickness changing region 22A-1 is desirably the cell effective area width (a few millimeters). The cell effective area width depends on the size and the disposed position of an imager and, for example, the cell effective area width is approximately 7 mm in the case of a DSC (Digital Still Camera) having an imager of 16M.

The partition section 222A of the present embodiment has a trapezoidal shape in cross-section, and the thickness thereof decreases toward the portion of the liquid crystal section 221a where the layer thickness thereof is uniform. In such a manner as to correspond to the variation in thickness of the partition section 222A, the thickness of the liquid crystal section 221a is varied in the layer thickness changing region 22A-1. In other words, the variation in thickness of the liquid crystal section 221a is adjusted by the thickness of the partition section 222A. The cross-sectional shape of the partition section 222A is not limited to the trapezoidal shape as long as the thickness of the liquid crystal section 221a is gradually varied; for example, the thickness may be varied in a quadratic curve form as shown in FIG. 10A and FIG. 10B, or may be varied in a stair-like form (in a step-like form) as shown in FIG. 10C. In order to orient the liquid crystal section 221a in the layer thickness changing region 22A-1 in a desired state, the partition section 222A is desirably configured of an orientation film. The partition section 222A as described may be formed by cutting the orientation film to adjust the thickness.

In addition, the layer thickness changing region 22A-1 is not limited to the one formed by the difference of the thickness of the partition section 222A. For example, as shown in FIG. 11A, it is possible that the face, close to the liquid crystal section 221a, of the transparent section 221b is so formed as to be inclined with respect to the optical axis L, and the partition section 222A having a uniform thickness is provided between the transparent section 221b and the liquid crystal section 221a. Further, as shown in FIG. 11B, the dimming cell 23 may be configured without the partition section 222A.

Figure 12A:
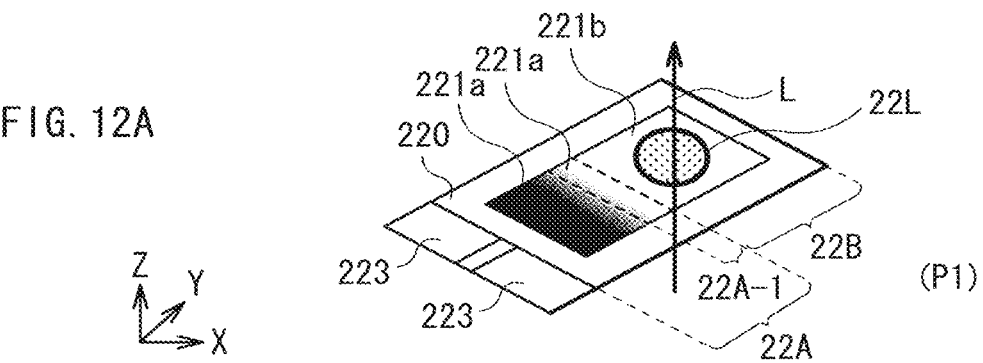
FIGS. 12A to 12C are perspective views for describing an operation of the dimming cell shown in FIG. 9.
Figure 12B:
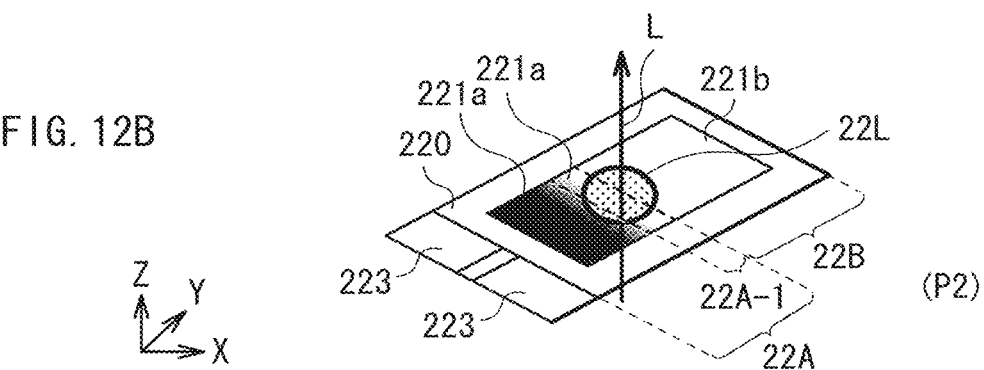
Figure 12C:
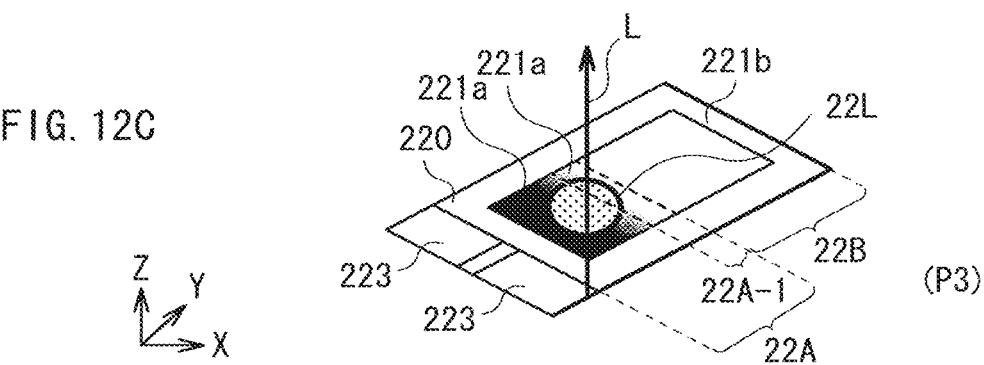

Also in the dimming cell 23 of the present embodiment, a dimming operation similar to that in the dimming cell 22 may be performed. As shown in FIGS. 12A to 12C, according to the brightness of a scene to be imaged, one of a second region 22B (FIG. 12A), a layer thickness changing region 22A-1 (FIG. 12B), and a first region 22A (FIG. 12C) where the layer thickness of the liquid crystal section 221a is uniform is placed at a dimming section 22L. Similarly to FIGS. 7A to 7C, a state where the second region 22B is placed at the dimming section 22L is represented by P1, a state where the layer thickness changing region 22A-1 is placed at the dimming section 22L is represented by P2, and a stated where the first region 22A in which the layer thickness of the liquid crystal section 221a is uniform is placed at the dimming section 22L is represented by P3. After the dimming cell 23 is put into one of the states P1, P2, and P3, image light inputted from the antireflection film 229b side passes through the liquid crystal section 221a and the transparent section 221b, and thereafter, the image light is emitted from the antireflection film 229a side. In addition, in the state P2 or P3, when a predetermined voltage (driving voltage) is applied to the liquid crystal section 221a, the orientation direction (longitudinal direction) of molecules M (liquid crystal molecules and dye molecules) is varied, and according to this, the amount of the image light passing through the liquid crystal section 221a is also varied.

Figure 13:
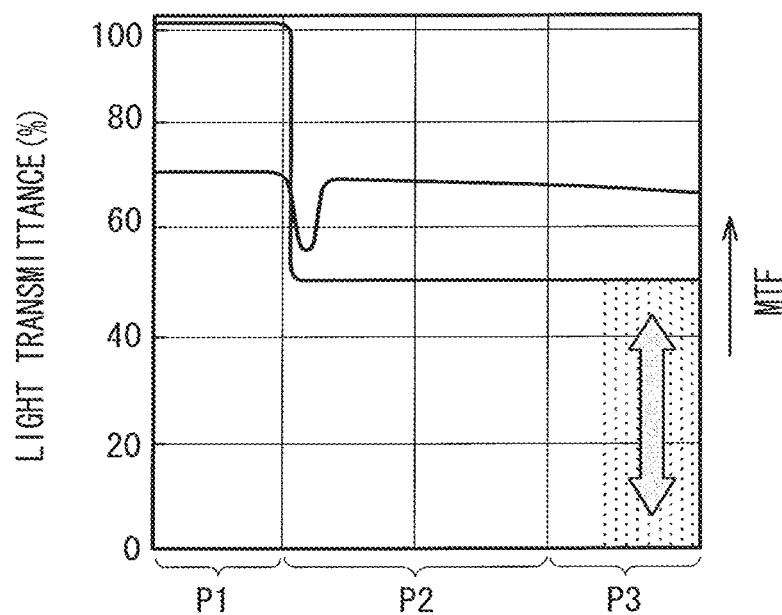
FIG. 13 is a view illustrating a variation in light transmittance and MTF in the operation of the dimming cell shown in FIGS. 7A to 7C.

In the present embodiment, dimming performed in the state P2 is different from that in the above-mentioned first embodiment (FIG. 7B). FIG. 13 schematically illustrates variations in light transmittance and MTF (Modulation Transfer Function) of the above-mentioned dimming cell 22 of the first embodiment in the states P1 to P3. MTF is an index of resolution, and the larger the numerical value of MTF is, the better the resolution is. The light transmittance of the dimming cell 22 is approximately 100% (about 98%) in the state P1, whereas in the state P3, in an exemplary case where the liquid crystal section 221a is configured of a GH type liquid crystal having a maximum light transmittance of 50% shown in FIG. 5, even if the light transmittance of the liquid crystal section 221a is in a high state (in the case where molecules M are of the negative type, when a voltage is applied thereto; in the case where molecules M are of the positive type, when no voltage is applied thereto), the light transmittance of the dimming cell 22 is 50%. Specifically, when the dimming cell 22 is shifted from the state P1 to the state P3, the transmittance of the light passing through the dimming cell 22 is sharply dropped from approximately 100% to 50%, and it is therefore difficult to adjust the light transmittance of the dimming cell 22 to between 100% and 50%. In addition, when the dimming cell 22 is shifted from the state P1 to the state P2, the shutter speed of the imaging device 1 is then doubled, and therefore an unnatural image may be generated. Further, an image taken in the state P2 in the middle of being shifted from the state P1 to the state P3, or an image taken by image light having passed through a region near the boundary between the liquid crystal section 221a and the transparent section 221b, may be an unnatural image due to a light-dark contrast (difference of light transmittance) thereof, and this is significant when a moving image is taken in particular. Additionally, when an image is taken in the state P2 of the dimming cell 22, MTF is also decreased by several percent or more due to the light-dark contrast.

Figure 14:
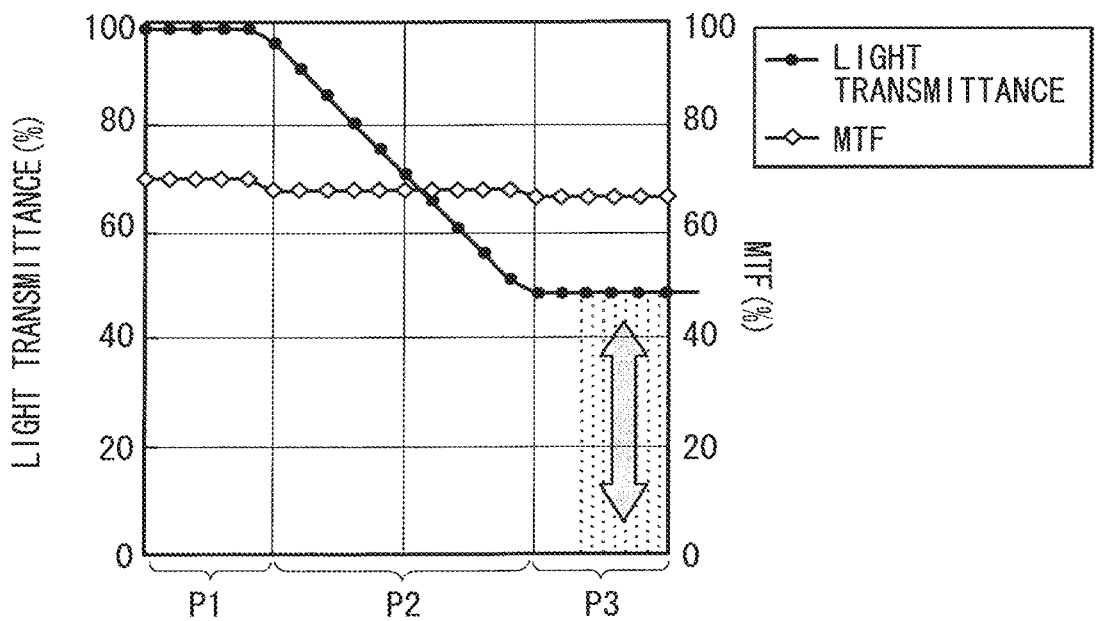
FIG. 14 is a view illustrating a variation in light transmittance and MTF in the operation of the dimming cell shown in FIGS. 12A to 12C.

Meanwhile, in the dimming cell 23 of the present embodiment, the thickness of the liquid crystal section 221a gradually decreases toward the transparent section 221b in the layer thickness changing region 22A-1, variation in light transmittance is gradual even in the state P2 as shown in FIG. 14. When the liquid crystal section 221a is in a high light transmittance state (for example, light transmittance of 50%), the light transmittance is gradually varied from 98% to 50% in the state in the middle of being shifted from the state P1 to the state P3 (state P2), and therefore it is possible to adjust the light transmittance of the dimming cell 23 to between 98% and 50%. With this seamless variation of light transmittance between the liquid crystal section 221a and the transparent section 221b, no light-dark contrast is generated between the liquid crystal section 221a and the transparent section 221b, and, even in the state P2, a natural image may be obtained at the time of taking a moving image without varying a shutter speed. In addition, as the physical properties thereof, at a moment the state P2 is established, difference of phase and difference of light amount is combined to slightly decrease the MTF. However, the decrease rate of MTF may be suppressed in comparison to that of the dimming cell 22 shown in FIG. 13.

Figure 15:
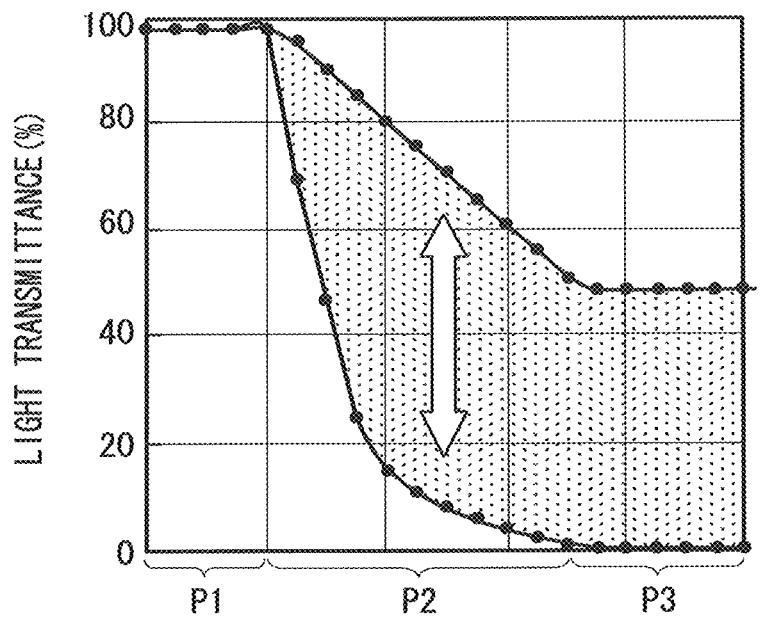
FIG. 15 is a view illustrating a dimming range in the operation of the dimming cell shown in FIGS. 12A to 12C.

It is needless to say that the dimming cell 23 may also vary the light transmittance in the state P2. FIG. 15 shows a dimming range in the states P1 to P3. For example, in the state P2, when the maximum transmittance is at approximately 80%, the minimum light transmittance may be lowered to approximately 15%. This is useful in the case where, for example, a photographer wants to take an image without waiting for the shifting of the dimming cell 23 when the photographer moves to another location having a different brightness value. For example, in the case where the photographer wants to take an image immediately after moving from a dark location to a bright location, the shifting of the dimming cell 23 is stopped in the state P2 in the middle of being shifted from the state P1 to the state P3, and imaging is started in the state where the light transmittance of the liquid crystal section 221a is suppressed as much as possible by adjusting a voltage value to be applied. By suppressing the exposure time as much as possible, the light amount may be further lowered. In such a circumstance, the orientation of the molecules M is varied faster than the shifting of the dimming cell 23, so that imaging may be performed while suppressing the decrease of MTF as much as possible.

Figure 16:
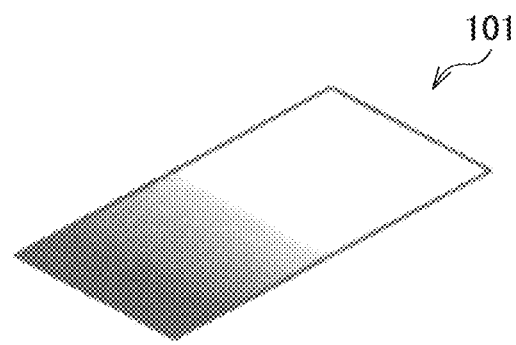
FIG. 16 is a perspective view illustrating an exemplary external configuration of an ND filter.
Figure 17:
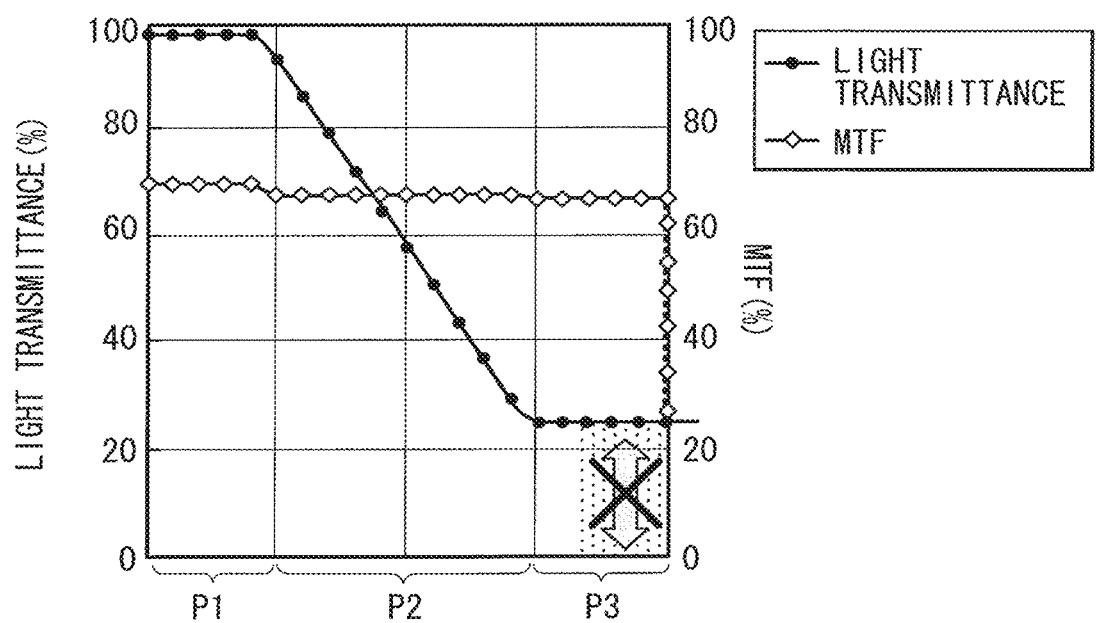
FIG. 17 is a view illustrating a variation in light transmittance and MTF in the case where the ND filter shown in FIG. 16 is shifted.

On the other hand, it is conceivable that dimming is performed with use of a gradation ND (Neutral Density) filter 101 (see FIG. 16) having a transparent section in place of the above-mentioned dimming cells (dimming cells 22 and 23) using the liquid crystal. However, unlike the liquid crystal section 221a, it is difficult for the gradation ND filter to vary the light transmittance in the states P2 and P3 as shown in FIG. 17. If a mechanical iris is used in combination, the light transmittance may be varied in the states P2 and P3; however, then the MTF is greatly decreased. In addition, imaging is possible in which the exposure speed is lowered as much as possible to adjust the light amount; in that case, however, there is a high possibility that an image with a deteriorated exposure is produced. Further, in the case of the gradation ND filter 101, adjustment of a light transmittance is performed only by controlling the location, and therefore it is difficult to finely perform dimming, and it is practically difficult to manufacture the gradation ND filter 101 having a minimum light transmittance of 0.5% or lower which is equivalent to the GH type liquid crystal.

As described above, since the dimming cell 23 according to the second embodiment is provided with the layer thickness changing region 22A-1, the variation in light transmittance is gradual in the state in the middle of being shifted from the state P1 to the state P3 (state P2). Consequently, for example, when a GH type liquid crystal having a maximum light transmittance of 50% and a minimum light transmittance of 0.5% or lower is used in the liquid crystal section 221a, by adjusting a timing at which a voltage applied and a timing at which the dimming cell 23 is shifted, it is possible to seamlessly adjust the light transmittance to between 100% to 0.5% or lower in the dimming cell 23. In addition, in the case where an image is taken in the state P2, it is possible to suppress an unnaturalness of an image and a decrease in MTF due to a light-dark contrast between the liquid crystal section 221a and the transparent section 221b.

[Modification]

Figure 18:
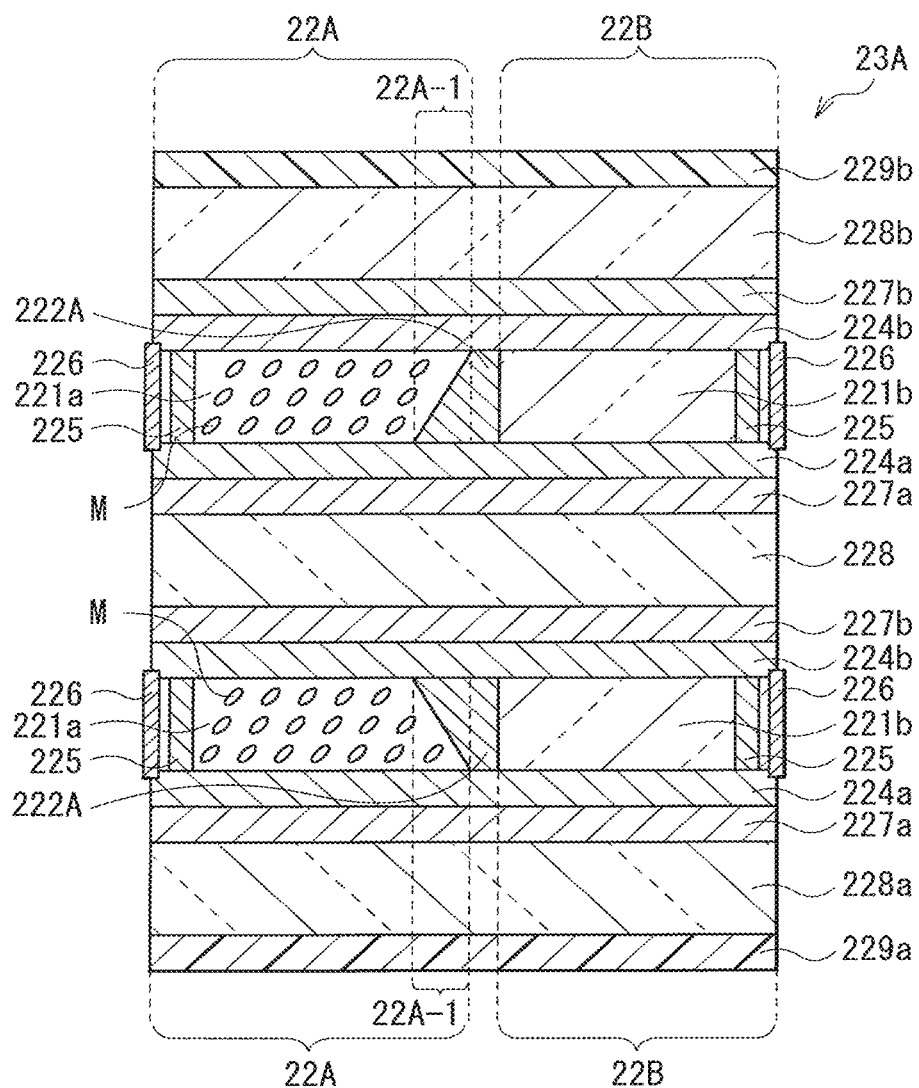
FIG. 18 is a cross-sectional view according to a modification of the dimming cell shown in FIG. 9.

FIG. 18 schematically illustrates an exemplary sectional configuration of a dimming cell 23A according to a modification of the above-mentioned second embodiment. Unlike the dimming cell 23 in which each of a liquid crystal section and a transparent section has one layer (single layer) structure (the liquid crystal section 221a and the transparent section 221b), in the dimming cell 23A, each of a liquid crystal section and a transparent section has a two-layer structure (a plurality of layers).

Specifically, the dimming cell 23A has a laminate structure in which a transparent substrate 228a, a transparent electrode 227a, an orientation film 224a, a liquid crystal section 221a or a transparent section 221b (containing layer 221), an orientation film 224b, a transparent electrode 227b, a transparent substrate 228, the transparent electrode 227a, the orientation film 224a, the liquid crystal section 221a or the transparent section 221b, the orientation film 224b, the transparent electrode 227b, and a transparent substrate 228b are disposed in this order. In other words, in the dimming cell 23A, a plurality (two) of the liquid crystal sections 221a and the transparent sections 221b (containing layers 221) are arranged in the traveling direction of an optical axis L. Similarly to the dimming cell 23, also in the dimming cell 23A, the liquid crystal section 221a and the transparent section 221b are segmented by a partition section 222A having a trapezoidal shape in cross-section, and the liquid crystal section 221a has a layer thickness changing region 22A-1. Sealing agents 226 and spacers 225 are provided on the lateral side of the liquid crystal section 221a and the transparent section 221b.

Similarly to the dimming cell 22, the two layers both serving as the liquid crystal section 221a are configured of a guest-host type liquid crystal containing a dichroic dye, and the light transmittance of the two layers both serving as the transparent section 221b is approximately 100%. Also in the dimming cell 23A, a dimming operation similar to that in the dimming cell 23 may be performed.

It should be noted that, because of the fact that the two liquid crystal sections 221a are laminated in the dimming cell 23A, the following effect is also obtained. First, generally, in a GH type liquid crystal, there is a limitation on the type and the dissolution amount of the dye when it is to be dissolved in a liquid crystal as a host, and it is known that the dimming range of a dimming cell is limited to a certain degree. Here, when a GH type liquid crystal having a certain concentration is used, although the dimming range may be increased by increasing the cell gap of the liquid crystal section (increasing the thickness), the increased cell gap causes an adverse effect on the response speed of the liquid crystal (the response speed of the liquid crystal is decreased).

Meanwhile, since the dimming cell 23A of the present modification is made up of the above-mentioned liquid crystal section 221a having the two-layer structure, the dimming range may be increased while not changing (without varying) the cell gap (thickness) of the liquid crystal section itself and while maintaining (without decreasing) the response speed of the liquid crystal.

As long as the liquid crystal sections 221a and the transparent sections 221b are laminated to overlap with each other, the face, close to the transparent section 221b, of the liquid crystal section 221a may be inclined in any direction. For example, the inclined directions of the two liquid crystal sections 221a may be identical to each other as shown in FIG. 19A and FIG. 19B, or may be opposite to each other as shown in FIG. 18 and FIG. 19C. In addition, the width of the layer thickness changing regions 22A-1 may be different between the liquid crystal sections 221a as shown in FIG. 20A, and the locations of the layer thickness changing regions 22A-1 may be different between the liquid crystal sections 221a as shown in FIG. 20B. Further, it is not necessary to provide the layer thickness changing region 22A-1 to all layers, and it is possible to laminate a liquid crystal section 221a to which no layer thickness changing region 22A-1 is provided, and a liquid crystal section 221a to which the layer thickness changing region 22A-1 is provided, as shown in FIG. 20C.

It is to be noted that, while a case has been described in which the liquid crystal section 221a and the transparent section 221b have the two-layer structure in the present embodiment, this is not restrictive, and the liquid crystal section 221a and the transparent section 221b may have a three-layer structure or more in the dimming cell.

[Other Modifications]

Hereinabove, while the present technology is described based on the embodiment and the modifications, the present technology is by no means limited to the above-described embodiment and so forth, and various modifications may be made. For example, while FIG. 18 shows the configuration in which the liquid crystal sections 221a each provided with the layer thickness changing region 22A-1 shown in FIG. 9 are laminated, a configuration is possible in which a plurality of the liquid crystal sections 221a (dimming cell 22) each having a uniform thickness shown in FIG. 4 are laminated in the optical axis L direction.

In addition, while an exemplary case has been described in which the liquid crystal section 221a and the transparent section 221b are disposed adjacent to each other with the partition section 222 therebetween in the dimming cell 22 in the above-mentioned embodiment and so forth, still another layer may be provided between the liquid crystal section 221a and the transparent section 221b.

Further, for example, while an exemplary case has been described in which the dimming cell using the GH type liquid crystal in the above-mentioned embodiment and so forth, this is not restrictive, and a liquid crystal section 221a using other liquid crystals than the GH type liquid crystal, such as a polymer-dispersed type liquid crystal (polymer-dispersed liquid crystal) may be used. Further, in place of the liquid crystal, an element capable of varying light transmittance such as an electrochromic element, a thermochromic element, and a photochromic element may be used.

Additionally, while the components (optical system) such as the lens barrel device and the imaging device are specifically described in the above-mentioned embodiment and so forth, it is not necessary to include all of the components, and, in addition, another component may be further included. It is to be noted that, while a digital still camera is exemplified as an imaging device in the above-mentioned embodiment and so forth, the present technology may be applied to an imaging device such as a video camera and TV camera, and various devices having a dimming cell including a light valve, a reflective displaying agent, an optical switching element or the like.

The present technology may be configured as follows.

(1) An optical device including:
a cell having a containing layer between a first transparent substrate disposed on a light incident side and a second transparent substrate which is disposed on a light emitting side and faces the first transparent substrate;
a variable transmittance section provided in a first region of the containing layer and allowing light transmittance to be varied within a predetermined range; and
a fixed transmittance section provided in a second region different from the first region as seen from the light incident side and having a light transmittance higher than that of the variable transmittance section.

(2) The optical device according to (1), wherein the variable transmittance section is configured of a liquid crystal section, and the fixed transmittance section is configured of a transparent section.

(3) The optical device according to (2), wherein a face, close to the transparent section, of the liquid crystal section is parallel to an optical axis.

(4) The optical device according to (2) or (3), wherein the face, close to the transparent section, of the liquid crystal section is inclined with respect to the optical axis.

(5) The optical device according to any one of (1) to (4), wherein the first region and the second region are partitioned by a partition section.

(6) The optical device according to (5), wherein the partition section is configured of an orientation film.

(7) The optical device according to any one of (2) to (6) further including a cell movement control section shifting the cell in a direction in which the liquid crystal section and the transparent section are arranged, and placing, on the optical axis, the liquid crystal section, the transparent section, or a region near the boundary between the liquid crystal section and the transparent section.

(8) The optical device according to any one of (2) to (7), wherein the liquid crystal section and the transparent section have substantially the same refractive index.

(9) The optical device according to any one of (2) to (8), wherein the refractive index of the transparent section is a value between a maximum value and a minimum value of the refractive index of the liquid crystal section, the refractive index of the liquid crystal section being varied according to a variation in the light transmittance of the liquid crystal section.

(10) The optical device according to any one of (2) to (9), wherein a plurality of the liquid crystal sections and a plurality of the transparent sections are arranged along the optical axis.

(11) The optical device according to any one of (2) to (10), wherein the liquid crystal section is configured of a guest-host (GH) type liquid crystal containing a dichroic dye.

(12) An imaging device including an imaging element and an optical device, the optical device including:
a cell having a containing layer between a first transparent substrate disposed on a light incident side and a second transparent substrate which is disposed on a light emitting side and faces the first transparent substrate;
a variable transmittance section provided in a first region of the containing layer and allowing light transmittance to be varied within a predetermined range; and
a fixed transmittance section provided in a second region different from the first region as seen from the light incident side and having a light transmittance higher than that of the variable transmittance section.

The present disclosure contains subject matter related to that disclosed in Japanese Priority Patent Application JP 2011-078494 filed in the Japan Patent Office on Mar. 31, 2011, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An optical device comprising:
a cell having a containing layer between a first transparent substrate disposed on a light incident side and a second transparent substrate which is disposed on a light emitting side and faces the first transparent substrate;
a variable transmittance section provided in a first region of the containing layer and allowing light transmittance to be varied within a predetermined range; and
a fixed transmittance section provided in a second region different from the first region as seen from the light incident side and having a light transmittance higher than that of the variable transmittance section,
wherein the variable transmittance section is configured of a liquid crystal section, and the fixed transmittance section is configured of a transparent section, and
wherein a face, close to the transparent section, of the liquid crystal section is inclined with respect to the optical axis.

2. An optical system comprising a plurality of optical devices according to claim 1, the plurality of optical devices arranged along an optical axis of the optical system.

3. The optical device according to claim 1, wherein the liquid crystal section is configured of a guest—host (GH) type liquid crystal containing a dichroic dye.

4. An imaging device comprising:
an imaging element; and
the optical device according to claim 1.

5. An optical device comprising:
a cell having a containing layer between a first transparent substrate disposed on a light incident side and a second transparent substrate which is disposed on a light emitting side and faces the first transparent substrate;
a variable transmittance section provided in a first region of the containing layer and allowing light transmittance to be varied within a predetermined range; and
a fixed transmittance section provided in a second region different from the first region as seen from the light incident side and having a light transmittance higher than that of the variable transmittance section,
wherein the first region and the second region are partitioned by a partition section, and
wherein the partition section is configured of an orientation film.

6. An optical system comprising a plurality of optical devices according to claim 5, the plurality of optical devices arranged along an optical axis of the optical system.

7. The optical device according to claim 5, wherein the liquid crystal section is configured of a guest—host (GH) type liquid crystal containing a dichroic dye.

8. An imaging device comprising:
an imaging element; and
the optical device according to claim 5.

9. An optical device comprising:
a cell having a containing layer between a first transparent substrate disposed on a light incident side and a second transparent substrate which is disposed on a light emitting side and faces the first transparent substrate;
a variable transmittance section provided in a first region of the containing layer and allowing light transmittance to be varied within a predetermined range; and
a fixed transmittance section provided in a second region different from the first region as seen from the light incident side and having a light transmittance higher than that of the variable transmittance section,
wherein the variable transmittance section is configured of a liquid crystal section, and the fixed transmittance section is configured of a transparent section,
the optical device further comprising a cell movement control section shifting the cell in a direction in which the liquid crystal section and the transparent section are arranged, and placing, on the optical axis, the liquid crystal section, the transparent section, or a region near the boundary between the liquid crystal section and the transparent section.

10. An optical system comprising a plurality of optical devices according to claim 9, the plurality of optical devices arranged along an optical axis of the optical system.

11. The optical device according to claim 9, wherein the liquid crystal section is configured of a guest—host (GH) type liquid crystal containing a dichroic dye.

12. An optical device comprising:
a cell having a containing layer between a first transparent substrate disposed on a light incident side and a second transparent substrate which is disposed on a light emitting side and faces the first transparent substrate;
a variable transmittance section provided in a first region of the containing layer and allowing light transmittance to be varied within a predetermined range; and
a fixed transmittance section provided in a second region different from the first region as seen from the light incident side and having a light transmittance higher than that of the variable transmittance section,
wherein the variable transmittance section is configured of a liquid crystal section, and the fixed transmittance section is configured of a transparent section, and
wherein the liquid crystal section and the transparent section have substantially the same refractive index.

13. The optical device according to claim 12, wherein the refractive index of the transparent section is a value between a maximum value and a minimum value of the refractive index of the liquid crystal section, the refractive index of the liquid crystal section being varied according to a variation in the light transmittance of the liquid crystal section.

14. An optical system comprising a plurality of optical devices according to claim 12, the plurality of optical devices arranged along an optical axis of the optical system.

15. The optical device according to claim 12, wherein the liquid crystal section is configured of a guest—host (GH) type liquid crystal containing a dichroic dye.

16. An optical device comprising:
a cell having a containing layer between a first transparent substrate disposed on a light incident side and a second transparent substrate which is disposed on a light emitting side and faces the first transparent substrate;
a variable transmittance section provided in a first region of the containing layer and allowing light transmittance to be varied within a predetermined range; and
a fixed transmittance section provided in a second region different from the first region as seen from the light incident side,
wherein a face, close to the fixed transmittance section, of the variable transmittance section is inclined with respect to an optical axis of the optical device.

17. The optical device according to claim 16, wherein a light transmittance of the fixed transmittance section is higher than a light transmittance of the variable transmittance section.

18. The optical device according to claim 16, wherein the variable transmittance section is configured of a liquid crystal section, and the fixed transmittance section is configured of a transparent section.

19. The optical device according to claim 18, wherein the liquid crystal section and the transparent section have substantially the same refractive index.

20. The optical device according to claim 18, wherein a plurality of the liquid crystal sections and a plurality of the transparent sections are arranged along the optical axis.

21. The optical device according to claim 18, wherein the liquid crystal section is configured of a guest—host (GH) type liquid crystal containing a dichroic dye.

22. An optical device comprising:
a cell having a containing layer between a first transparent substrate disposed on a light incident side and a second transparent substrate which is disposed on a light emitting side and faces the first transparent substrate;
a variable transmittance section provided in a first region of the containing layer and allowing light transmittance to be varied within a predetermined range; and
a fixed transmittance section provided in a second region different from the first region as seen from the light incident side; and
a cell movement control section configured to shift the cell in a direction in which the variable transmittance section and the fixed transmittance section are arranged, and placing, on the optical axis, the variable transmittance section, the fixed transmittance section, or a region near the boundary between the variable transmittance section and the fixed transmittance section.

23. The optical device according to claim 22, wherein
the variable transmittance section is configured of a liquid crystal section, and
the fixed transmittance section is configured of a transparent section.

24. An optical device comprising:
a cell having a containing layer between a first transparent substrate disposed on a light incident side and a second transparent substrate which is disposed on a light emitting side and faces the first transparent substrate;
a variable transmittance section provided in a first region of the containing layer and allowing light transmittance to be varied within a predetermined range; and
a fixed transmittance section provided in a second region different from the first region as seen from the light incident side,
wherein the variable transmittance section and the fixed transmittance section have substantially the same refractive index.

25. The optical device according to claim 24, wherein
the variable transmittance section is configured of a liquid crystal section, and
the fixed transmittance section is configured of a transparent section.

26. The optical device according to claim 25, wherein the refractive index of the transparent section is a value between a maximum value and a minimum value of the refractive index of the liquid crystal section, the refractive index of the liquid crystal section being varied according to a variation in the light transmittance of the liquid crystal section.

27. An optical device comprising:
a cell having a containing layer between a first transparent substrate disposed on a light incident side and a second transparent substrate which is disposed on a light emitting side and faces the first transparent substrate;
a variable transmittance section provided in a first region of the containing layer and allowing light transmittance to be varied within a predetermined range; and
a fixed transmittance section provided in a second region different from the first region as seen from the light incident side, wherein
the first region and the second region are partitioned by a partition section, and
the partition section includes an orientation film.

* * * * *